US008854306B2

(12) United States Patent
Seo et al.

(10) Patent No.: US 8,854,306 B2
(45) Date of Patent: Oct. 7, 2014

(54) MOBILE TERMINAL

(75) Inventors: Seongyoung Seo, Gyeonggi-Do (KR); Yunhwan Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 64 days.

(21) Appl. No.: 12/958,305

(22) Filed: Dec. 1, 2010

(65) Prior Publication Data

US 2011/0141024 A1    Jun. 16, 2011

(30) Foreign Application Priority Data

Dec. 15, 2009 (KR) ........................ 10-2009-0125065

(51) Int. Cl.
*G06F 3/041* (2006.01)
*H01H 13/83* (2006.01)

(52) U.S. Cl.
CPC ......... *H01H 13/83* (2013.01); *H01H 2231/022* (2013.01); *H01H 2205/002* (2013.01); *H01H 2209/038* (2013.01); *H01H 2209/082* (2013.01); *H01H 2201/018* (2013.01); *H01H 2300/036* (2013.01)
USPC .......................................................... 345/168

(58) Field of Classification Search
USPC ................................ 345/156–173; 340/407.1
See application file for complete search history.

(56) References Cited

U.S. PATENT DOCUMENTS 4,017,848 A 4/1977 Tannas
6,776,546 B2 8/2004 Kraus et al.
6,880,998 B2 * 4/2005 Kraus et al. .................. 400/714
7,339,577 B2 * 3/2008 Sato et al. .................. 345/173
2005/0007349 A1 1/2005 Vakil et al.
2008/0082934 A1 * 4/2008 Kocienda et al. ............. 715/773
2008/0273002 A1 * 11/2008 Kim et al. ....................... 345/98
2009/0158222 A1 * 6/2009 Kerr et al. ..................... 715/867
2009/0179861 A1 * 7/2009 Skillman et al. .............. 345/168
2009/0256809 A1 * 10/2009 Minor .......................... 345/173
2009/0270078 A1 * 10/2009 Nam et al. ................. 455/414.1
2010/0277421 A1 * 11/2010 Charlier et al. .............. 345/173
2011/0223444 A1 * 9/2011 Brown et al. ................ 428/688

FOREIGN PATENT DOCUMENTS

CN 101212752 7/2008

* cited by examiner

*Primary Examiner* — Srilakshmi K Kumar
*Assistant Examiner* — Damon Treitler
(74) *Attorney, Agent, or Firm* — Lee, Hong, Degerman, Kang & Waimey

(57) ABSTRACT

A mobile terminal includes: a light-transmissive actuator having a dome-like shape; a conductive coating layer formed to be light-transmissive and formed at an inner side of the actuator; a light-transmissive base including a first light-transmissive electrode pattern and a second light-transmissive electrode pattern formed thereon, the first light-transmissive electrode pattern being configured to contact with the edge of the actuator, and the second light-transmissive electrode pattern being configured to contact with the central portion of the actuator when the actuator is pressed; and a display unit disposed under the light-transmissive base and configured such that visual information is seen thereon through the actuator, the coated layer and the base.

16 Claims, 21 Drawing Sheets

MOBILE TERMINAL

CROSS REFERENCE TO RELATED APPLICATIONS

Pursuant to 35 U.S.C.§119 (a), this application claims the benefit of earlier filing date and right of priority to Korean Patent Application No. 10-2009-0125065 filed on Dec. 15, 2009, the contents of which are hereby incorporated by reference in their entirety.

FIELD OF THE INVENTION

The present invention relates to a keypad structure and a keypad display method.

DESCRIPTION OF THE RELATED ART

A mobile terminal is a device that can be carried around and has one or more functions such as voice and video call communication, inputting and outputting information, storing data, and the like.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to implement various functions of such multimedia players or devices, the multimedia player requires sufficient support in terms of hardware or software, for which numerous attempts are being made and implemented. For example, a user interface allowing users to easily and conveniently search for and select one or more functions is offered.

One of input devices of conventional mobile terminals is a keypad or a side key implemented by using elasticity of a metal dome. The metal dome connects one contact point to another contact point formed on a circuit board, to generate an input signal.

However, in case of the keypad or side key using the metal dome according to the related art, key marks of each key are formed such that they cannot be changed, so it is not easy to display input content according to each mode of the mobile terminal. In addition, when various key marks are formed on each key of the keypad, the external appearance of the mobile terminal is degraded.

SUMMARY OF THE INVENTION

Accordingly, one object of the present invention is to address the above-noted and other problems.

Another object of the present invention is to provide a mobile terminal in which key marks indicating content to be inputted or controlled can be changeable according to each mode of the mobile terminal.

To achieve these and other advantages and in accordance with the purpose of the present invention, as embodied and broadly described herein, the present invention provides in one aspect a mobile terminal including: a light-transmissive (e.g., translucent or transparent) actuator having a dome-like shape; a conductive coating layer formed to be light-transmissive and formed at an inner side of the actuator; a light-transmissive base including a first light-transmissive electrode pattern and a second light-transmissive electrode pattern formed thereon, the first light-transmissive electrode pattern being configured to contact with the edge of the actuator, and the second light-transmissive electrode pattern being configured to contact with the central portion of the actuator when the actuator is pressed; and a display unit disposed under the light-transmissive base and configured such that visual information is seen thereon through the actuator, the coated layer and the base.

The actuator may include a plurality of dome parts which are formed on an integral film such that they correspond to respective keys.

The conductive coating layer and the first and second electrode patterns may be made of light-transmissive carbon nano-tube (CNT) or light-transmissive conductive polymer. In this case, the mobile terminal may further include: a resistance corrector configured to correct the deviation of resistance according to the lengths of the respective first electrode patterns corresponding to each actuator.

The display unit may be light-transmissive, and a touch sensing layer may be additionally provided at a lower side of the display unit.

The light-transmissive base may be attached on an upper surface of the display unit.

To achieve these and other advantages and in accordance with the purpose of the present invention, as embodied and broadly described herein, the present invention provides in another aspect a mobile terminal including: a first body having a keypad device and a second body foldably coupled to the first body and having a first display unit provided on an inner surface thereof in a closed state, wherein the keypad device includes: a light-transmissive (e.g., translucent or transparent) actuator having a dome-like shape; a conductive coating layer formed to be light-transmissive and formed at an inner side of the actuator; a light-transmissive base including a first light-transmissive electrode pattern and a second light-transmissive electrode pattern formed thereon, the first light-transmissive electrode pattern being configured to contact with the edge of the actuator, and the second light-transmissive electrode pattern being configured to contact with the central portion of the actuator when the actuator is pressed; and a second display unit disposed under the light-transmissive base and configured such that visual information is seen thereon through the actuator, the coated layer and the base.

The visual information outputted to the second display unit may be formed to correspond each actuator and may be a thumbnail image of an image to be outputted to the first display unit.

To achieve these and other advantages and in accordance with the purpose of the present invention, as embodied and broadly described herein, the present invention provides in still another aspect a mobile terminal including: a first body having a keypad device and a second body foldably coupled to the first body and having a first display unit provided on an inner surface thereof in a closed state and a second keypad device disposed at one side of the first display unit, wherein the keypad device includes: a light-transmissive (e.g., translucent or transparent) actuator having a dome-like shape; a conductive coating layer formed to be light-transmissive and formed at an inner side of the actuator; a light-transmissive base including a first light-transmissive electrode pattern and a second light-transmissive electrode pattern formed thereon, the first light-transmissive electrode pattern being configured to contact with the edge of the actuator, and the second light-transmissive electrode pattern being configured to contact with the central portion of the actuator when the actuator is pressed; and a second display unit disposed under the light-transmissive base and configured such that visual information is seen thereon through the actuator, the coated layer and the base.

The second display unit may be implemented to extend from the first display unit.

To achieve these and other advantages and in accordance with the purpose of the present invention, as embodied and broadly described herein, the present invention provides in yet another aspect a mobile terminal including: a light-transmissive keypad having a plurality of first areas corresponding to respective light-transmissive dome keys and a second area formed at portions other than the first areas; and a display unit disposed at a lower side of the light-transmissive keypad, wherein each of the light-transmissive keys includes: a light-transmissive actuator having a dome-like shape; a conductive coating layer formed to be light-transmissive and formed at an inner side of the actuator; and a light-transmissive base including a first light-transmissive electrode pattern and a second light-transmissive electrode pattern formed thereon, the first light-transmissive electrode pattern being configured to contact with the edge of the actuator, and the second light-transmissive electrode pattern being configured to contact with the central portion of the actuator when the actuator is pressed.

To achieve these and other advantages and in accordance with the purpose of the present invention, as embodied and broadly described herein, the present invention provides in another aspect a method for displaying a keypad of a mobile terminal, including: confining a plurality of first areas corresponding to respective light-transmissive dome keys and a second area around the first areas; displaying a first set of key marks at the first areas; and displaying a second set of key marks different from the first set of key marks at the first areas according to a mode change signal.

The mode change signal may be a signal for executing at least one application program, and the second set of key marks may be commands related to performing of the function of the application program or corresponding graphics or icons.

At least one of the plurality of light-transmissive dome keys may include a key mark change key exclusively used to change the key marks.

To achieve these and other advantages and in accordance with the purpose of the present invention, as embodied and broadly described herein, the present invention provides in another aspect a method for displaying a keypad of a mobile terminal, including: confining a plurality of first areas corresponding to respective light-transmissive dome keys and a second area around the first areas; displaying a first set of key marks at the first areas; and displaying a second set of key marks different from the first set of key marks according to a mode change signal, and displaying visual information related to the second set of key marks at the second area.

To achieve these and other advantages and in accordance with the purpose of the present invention, as embodied and broadly described herein, the present invention provides in another aspect a method for displaying a keypad of a mobile terminal, including: confining a plurality of first areas corresponding to respective light-transmissive dome keys and a second area around the first areas; displaying a first set of key marks at the first areas; and when there is a mode change signal for changing a mode to a particular application, displaying a second set of key marks related to the particular application.

To achieve these and other advantages and in accordance with the purpose of the present invention, as embodied and broadly described herein, the present invention provides in another aspect a method for displaying a keypad of a mobile terminal, including: confining a first display area including a plurality of light-transmissive dome keys and a second display area disposed at a position differentiated from the first display area; confining a plurality of first areas corresponding to respective light-transmissive dome keys and a second area around the first areas within the first display area; displaying a first set of key marks at the first areas; displaying first visual information related to an input of a key mark selected from among the first set of key marks on the first display area; and displaying second visual information related to the first visual information on the second display area.

To achieve these and other advantages and in accordance with the purpose of the present invention, as embodied and broadly described herein, the present invention provides in another aspect a method for displaying a keypad of a mobile terminal, including: confining a first display area including a plurality of light-transmissive dome keys and a second display area disposed at a position differentiated from the first display area; confining a plurality of first areas corresponding to respective light-transmissive dome keys and a second area around the first areas within the first display area; displaying a first set of key marks at the first areas; displaying first visual information related to an input of a key mark selected from among the first set of key marks on the first display area; and displaying a second set of key marks for executing a particular application related to the input of the key mark selected from among the first set of key marks at the first areas.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 2 and 3 are perspective views of the mobile terminal according to an exemplary embodiment of the present invention, in which FIG. 2 illustrates a closed configuration of the mobile terminal and FIG. 3 illustrates an open configuration of the mobile terminal;

DETAILED DESCRIPTION OF THE INVENTION

Reference will now be made in detail to the preferred embodiments of the present invention, examples of which are illustrated in the accompanying drawings.

Figure 1:
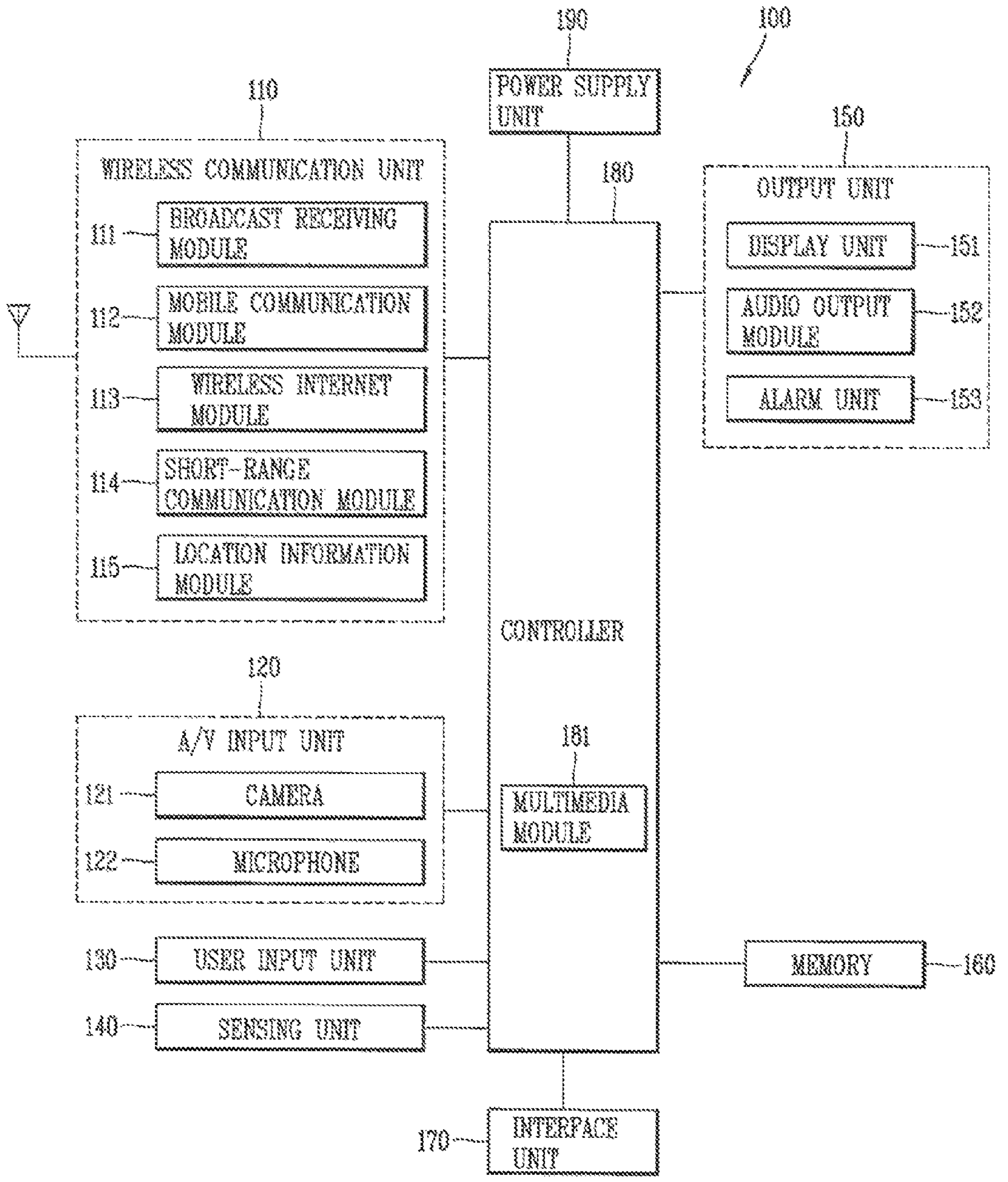
FIG. 1 is a schematic block diagram of a mobile terminal according to an exemplary embodiment of the present invention.

FIG. 1 is a schematic block diagram of a mobile terminal according to an exemplary embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

A proximity sensor may be disposed within or near the touch screen. The proximity sensor is a sensor for detecting the presence or absence of an object relative to a certain detection surface or an object that exists nearby by using the force of electromagnetism or infrared rays without a physical contact. Thus, the proximity sensor has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor. In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100

(e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The memory 160 may store programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2:
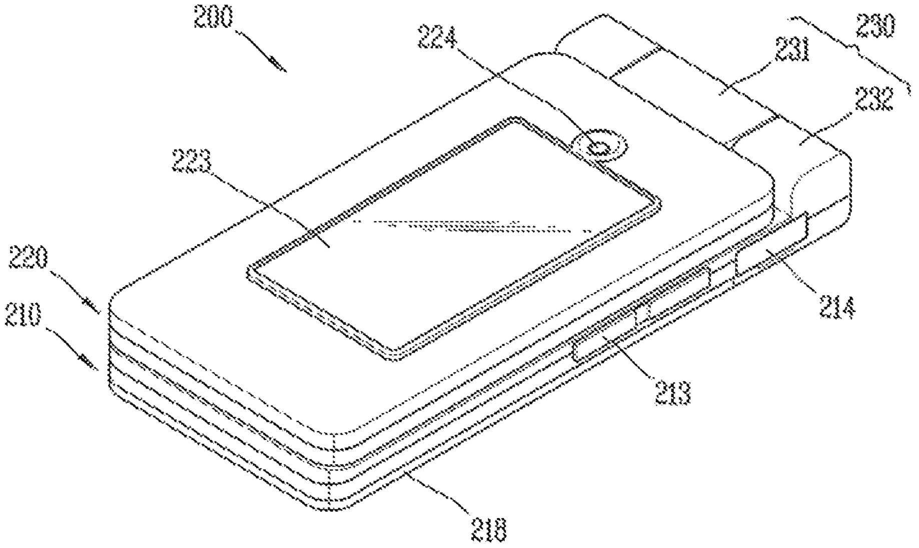
Figure 3:
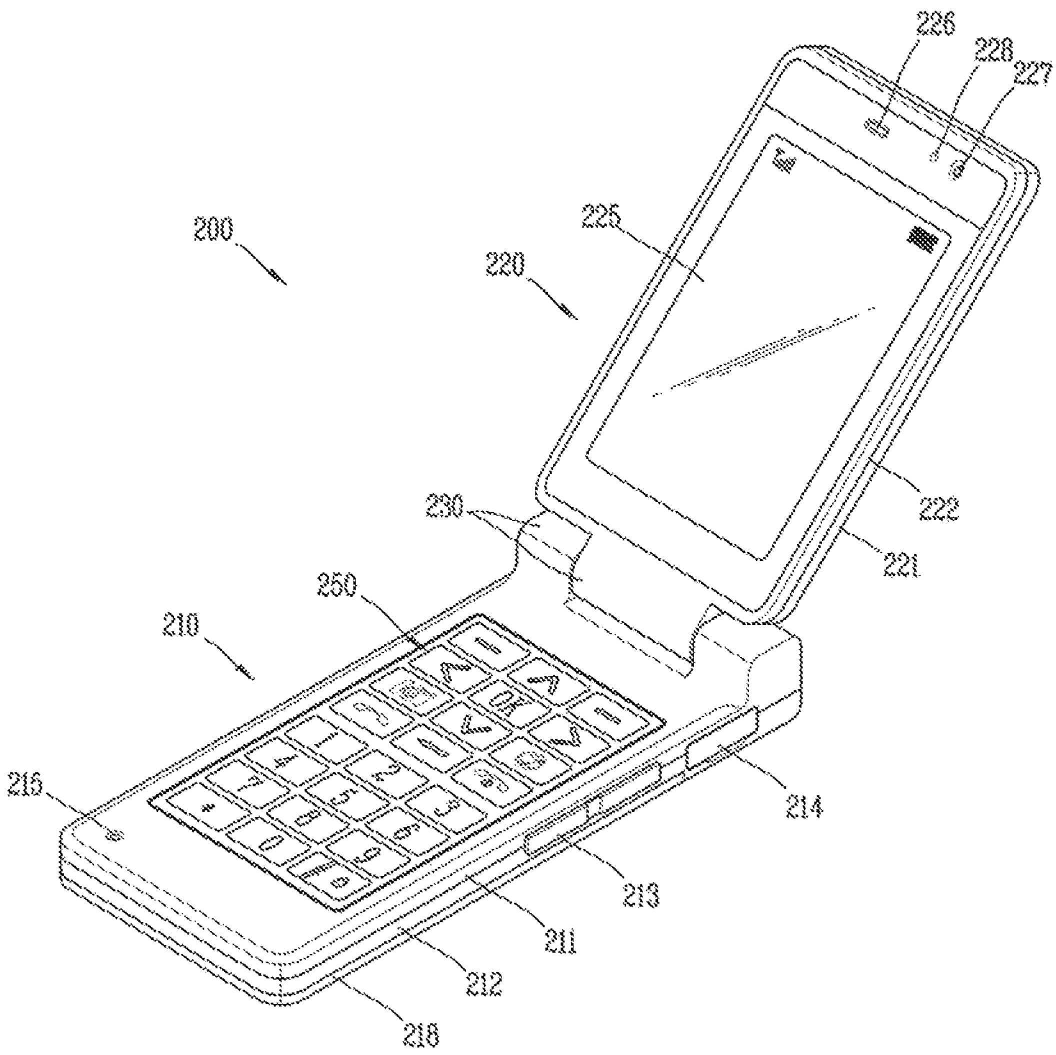

FIGS. 2 and 3 are perspective views of the mobile terminal according to an exemplary embodiment of the present invention, in which FIG. 2 illustrates a closed configuration of the mobile terminal and FIG. 3 illustrates an open configuration of the mobile terminal.

As shown in FIGS. 2 and 3, a mobile terminal 200 includes a first body 210 and a second body 220 configured to be folded to and unfolded from the first body 210 by a hinge part 230. The first and second bodies 210 and 220 include a hinge part connected in an axial direction, respectively. A first hinge part 231 of the first body 210 and a second hinge part 232 of the second body 220 are disposed on the single shaft so as to be folded to and unfolded from each other.

However, the present invention is not limited thereto and may be applicable to a slide type mobile terminal, a folder type mobile terminal, a swing type mobile terminal, a swivel type mobile terminal, etc, in which two or more bodies are combined to be relatively movable.

As shown in FIG. 2, a state in which the first body 210 is disposed to overlap with the second body 220 may be called a closed configuration, and as shown in FIG. 3, a state in which the first and second bodies 210 and 220 are relatively rotated to become away from each other may be called an open configuration.

In the closed configuration, the mobile terminal mainly operates in a standby (or idle) mode, and the standby mode may be released upon user manipulation. The mobile terminal operates mainly in the calling mode or the like in the open configuration, and it can be changed to the standby mode with the lapse of time or upon user manipulation.

Various examples of functions and components that may be disposed on each surface of the first and second bodies 210 and 220 may be induced depending on which function the mobile terminal 200 stresses or which kind of interfaces the mobile terminal 200 is seeking.

The case (or casing, housing, cover, etc.) constituting the external appearance of the first body 210 may include an inner case 211 and an outer case 212. Various electronic components are installed in the space between the inner case 211 and the outer case 212. One or more intermediate cases may be additionally disposed between the inner case 211 and the outer case 212. Like the first body 210, the second body 220 may include an inner case 222 and an outer case 221.

As shown in FIG. 2, a first display unit 223 and a first camera 224 may be disposed on an outer surface of the second body 220 exposed in the closed configuration.

The first display unit 223 may be implemented, for example, as a Liquid Crystal Display (LCD), an Organic Light Emitting Diode (OLED), a TOLED (Transparent OLED), and the like, that can visually express information. The first display unit 223 may provide various visual information of the mobile terminal even in the closed configuration of the mobile terminal 200.

The first camera 224 may capture an image or video of the user himself or an external subject even in the closed configuration. Also, the first camera 224 may capture an image or video of an external subject also in the open configuration.

As shown in FIG. 3, a second display unit 225, an audio output unit 228, a second camera 227, and an illumination sensor 228 may be disposed on the inner surface of the second body 220 exposed in the open configuration.

Like the first display unit 223, the second display unit 225 can be also implemented by various display devices, and may additionally include a touch sensing unit allowing an input by user's touch. Also, the touch sensing unit may be configured to interwork with a proper output unit (e.g., a vibration generation unit) other than a visual or audible output unit such as the display units 223 and 225 and the audio output unit 226.

The audio output unit 226 may be serve as a receiver for outputting a call sound when the mobile terminal 200 is used in a call mode in the open configuration, or may be configured to output various system notification sounds.

The camera 227 may be used to capture an image of the user himself in a case, for example, in which the user performs video communication by using the second display unit 225.

An illumination sensor 228 disposed at one side of an upper end of the second body 220 detects brightness therearound in order to allow brightness of the second display unit to be adjusted.

As shown in FIG. 3, a microphone 215 and a keypad device 250 related to the present invention are installed on an inner surface of the first body 210 exposed in the open configuration of the mobile terminal 200.

The keypad device 250 includes a plurality of keys and may be divided into sections for inputting characters or numbers and sections for directly executing various functions. In the former case, the keypad device 250 may constitute a Qwerty board. The configuration of each key constituting the keypad device 250 will be described with reference to FIG. 4.

The microphone 215 is configured to input voice in order to input user's voice during call communication or input a voice in recording video or the like. Unlike the microphone 215 shown in FIG. 3, the microphone 215 may be installed on the side of the first body 210.

An interface unit 214 or a side key 213 may be installed on the side of the first body 210.

The side key 213 may operate as a hot key for performing a special function such as activation of the cameras 224 and 227 and forms a user input unit along with the keypad device 250.

The interface unit 214 may be used as a link (passage or path) through which the mobile terminal 200 can exchange data or the like with an external device. For example, the interface unit 214 may be implemented as one of a connection port for connecting an earphone to the mobile terminal via a fixed or wireless means, a port for short-range communications (e.g., an Infrared Data Association (IrDA) port, a Bluetooth™ port, a wireless LAN port, etc.), power supply ports for providing power to the mobile terminal, or the like.

The interface unit 214 may be a card socket for accommodating a SIM (Subscriber Identification Module) or a UIM (User Identity Module), or an external card such as a memory card for storing information.

A broadcast signal receiving antenna may be disposed at one side or region of the first and second bodies 210 and 220, in addition to an antenna that supports mobile communications. The antenna can be configured to be retractable from one of the first and second bodies 210 and 220.

A power supply unit 218 for supplying power to the mobile terminal 200 may be mounted on the first body 210. The power supply unit 218 may be detachably coupled to charge power as a rechargeable battery.

Figure 4:
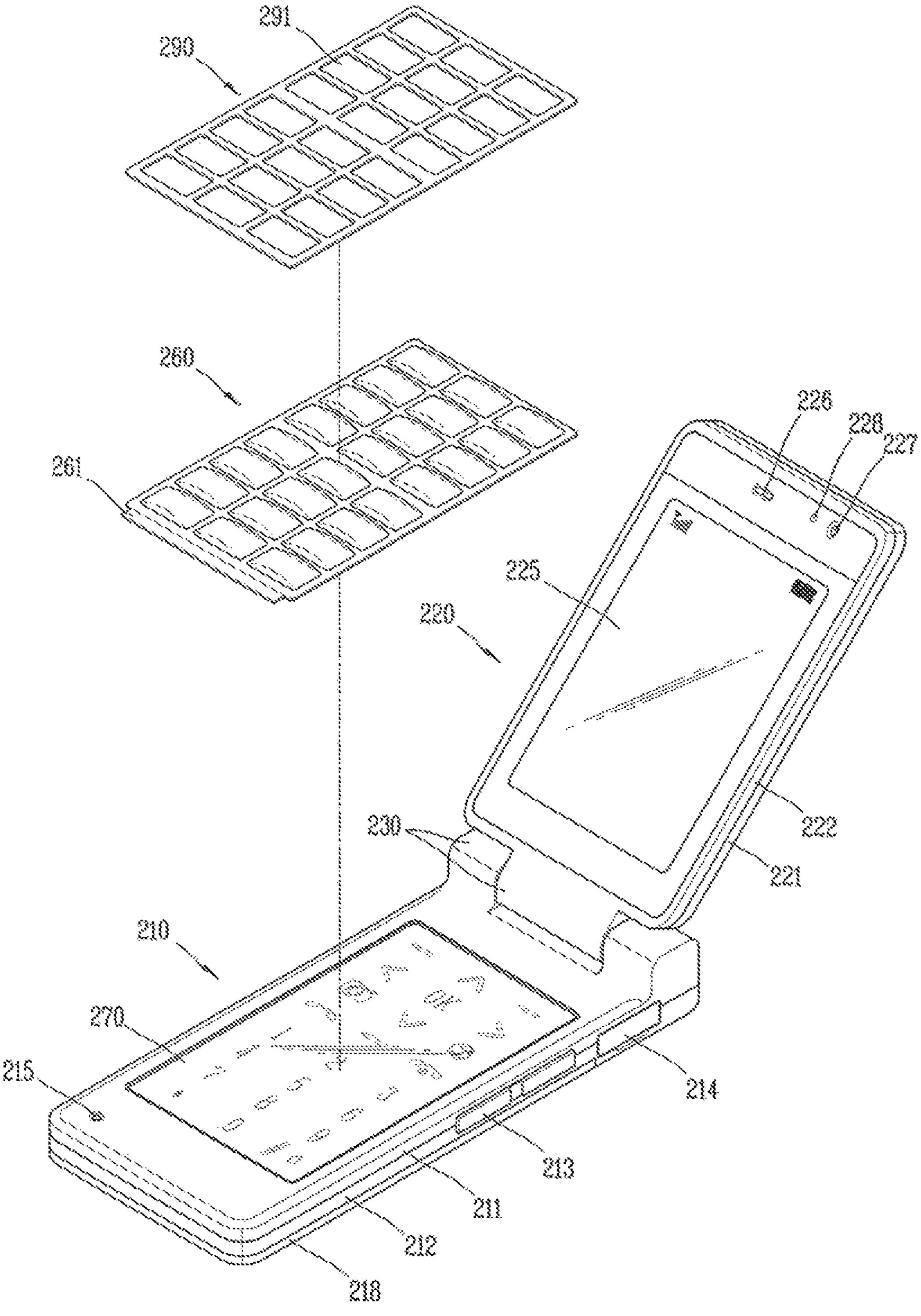
FIG. 4 is an exploded perspective view showing a light-transmissive keypad of a keypad device separated from a first body of the mobile terminal according to an exemplary embodiment of the present invention.
Figure 5:
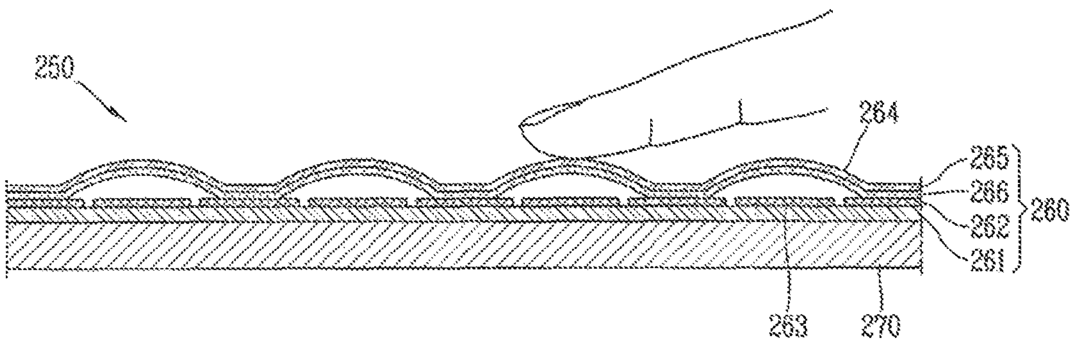
FIG. 5 is a sectional view of the keypad device.
Figure 6:
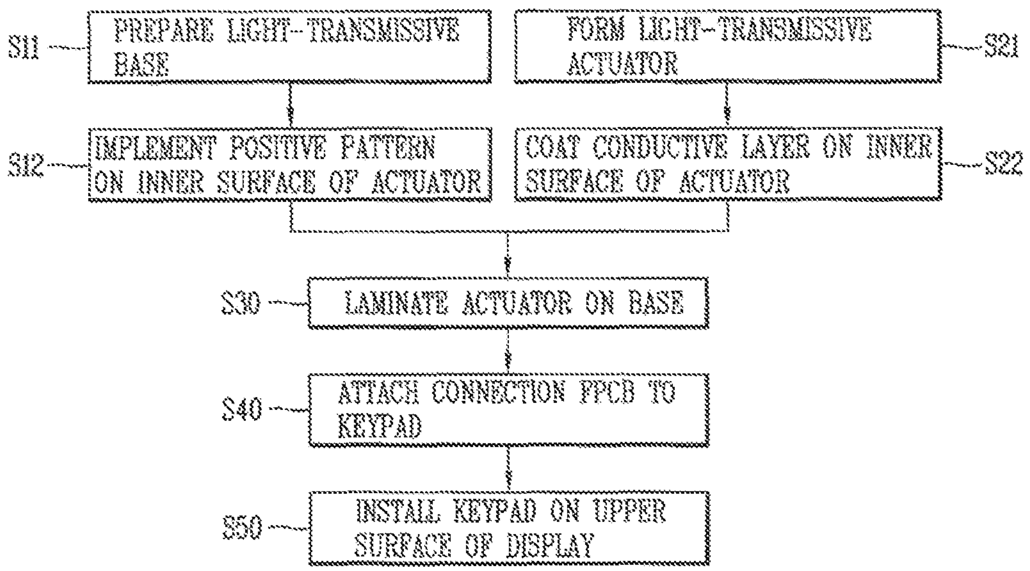
FIG. 6 is a flow chart illustrating the process of manufacturing the keypad device according to an exemplary embodiment of the present invention.

FIG. 4 is an exploded perspective view showing a light-transmissive keypad of a keypad device separated from a first body 210 of the mobile terminal 200 according to an exemplary embodiment of the present invention. FIG. 5 is a sectional view of the keypad device. FIG. 6 is a flow chart illustrating the process of manufacturing the keypad device according to an exemplary embodiment of the present invention.

As shown in FIGS. 4 to 6, the keypad device 250 according to an exemplary embodiment of the present invention includes a light-transmissive keypad 260 and a key display unit 270 disposed at an inner side of the light-transmissive keypad 260. With reference to FIG. 4, in an alternative embodiment, a keypad cover layer 290 may be additionally included in the keypad device 250. The keypad cover layer 290, which has a plurality of through holes 291, may be disposed over the light-transmissive keypad 260 such that dome parts 264 of the actuator 265 (discussed below referring to FIG. 5) are exposed via the plurality of through holes 291 of the keypad cover layer 290. When the keypad cover layer 290 is placed over the light-transmissive keypad 260, somewhat protruded surfaces of the dome parts 264 may be felt substantially flat when the surfaces of the dome parts are exposed via the plurality of through holes 291 of the keypad cover layer 290.

The light-transmissive keypad 260 includes mechanical units for generating an input signal when the light-transmissive keypad 260 is pressed in a push manner for inputting, and as shown in FIG. 4, the light-transmissive keypad 260 may be formed in the form of a single independent module. In order to be connected with an internal circuit board (not shown), the light-transmissive keypad 260 include a flexible PCB 261.

With reference to FIG. 5, the light-transmissive keypad 260 is configured to include an actuator 265, a coated layer 266, first and second electrode patterns 262 and 263 and a base 261. These elements are light-transmissive to allow visual information outputted to the display unit 270 disposed at a lower side thereof can be seen therethrough. Here, the light-transmissivity allows for recognition of visual information outputted to the display unit 270, which includes a semi-light-transmissivity. Thus, at least one of them may additionally include a semi-light-transmissive layer.

The actuator 265 includes dome parts 264 corresponding to the respective keys. The light-transmissive actuator 265 is also called a 'transmissive dome key'. These dome parts 264 may be formed by molding, pressing, or the like, a light-transmissive polymer film (S21). The actuator 265 may be integrally implemented by forming several dome parts 264 on a single sheet of transparent film, thus simplifying the fabrication and reducing a fabrication cost.

The conductive coating layer 266 is formed on an inner surface of the actuator 265 (S22). The conductive coating layer 266 serves to electrically connect the first and second electrode patterns 262 and 263 according to deformation of the actuator 265. The conductive coating layer 266 is formed by coating a light-transmissive carbon nano-tube (CNT) or conductive polymer, and the like, on the inner surface of the actuator 265.

The first and second electrode patterns 262 and 263 are formed on an upper surface of the base 261 formed with transparent polymer or the like (S12), which are patterned to implement a circuit of an individual key. The edge of the dome part 264 of the actuator 265 is in contact with the first electrode pattern 262, and the conductive coating layer 266 positioned at the center of the dome part 264 of the actuator 265 is brought into contact with the second electrode pattern 263 when the actuator 265 is pressed. Like the conductive coating layer 266, the first and second electrode patterns 262 and 263 may be also made of light-transmissive carbon nano-tube or conductive polymer having excellent mechanical, chemical characteristics. The first electrode pattern 262 may be configured such that the portion of the first electrode pattern 262 with which the edges of the dome part 264 of the actuator 265 are brought into contact may be thicker than other portions so that it cannot be abraded to become thinner due to a repeated pressing operation of the actuator 265 or degradation of the operational reliability can be prevented. The first electrode pattern 262 may include an air passage hole (not shown) allowing air within the pressed actuator 265 to be leaked out.

The actuator 265 with the conductive coating layer 266 coated on its inner surface is laminated on the upper surface of the base 261 on which the first and second electrode patterns 262 and 263 are formed (S30). Accordingly, the conductive coating layer 266 at the edge side of the dome part 264 of the actuator 265 and the first electrode pattern 262 are permanently in contact with each other.

The thusly formed light-transmissive keypad 260 can have units for generating an input signal in a state that it does not have any key marks for discriminating each key.

A connector or a flexible PCB 261 is attached to one side of the light-transmissive keypad 260 in order to connect the light-transmissive keypad 260 to a circuit board at the inner side of the first body 210 (S40).

The prepared light-transmissive keypad 260 is installed on an upper surface of the display unit 270 (S50). In order to attach the light-transmissive keypad 260 to the display unit 270, an adhesive or an adhesive tape may be used. The display unit 270 is used to provide key marks or the like for identifying each key of the light-transmissive keypad 260. FIG. 4 shows an output state of key marks of the keys that can be operated by each actuator of the light-transmissive keypad 260 by the display unit 270.

Like the first display unit 223 and the second display unit 225 as described above, the display unit 270 may be implemented as a Liquid Crystal Display (LCD) module, an Organic Light Emitting Diode (OLED) module, a TOLED (Transparent Organic Light Emitting Diode) module, an e-paper, and the like.

Figure 7:
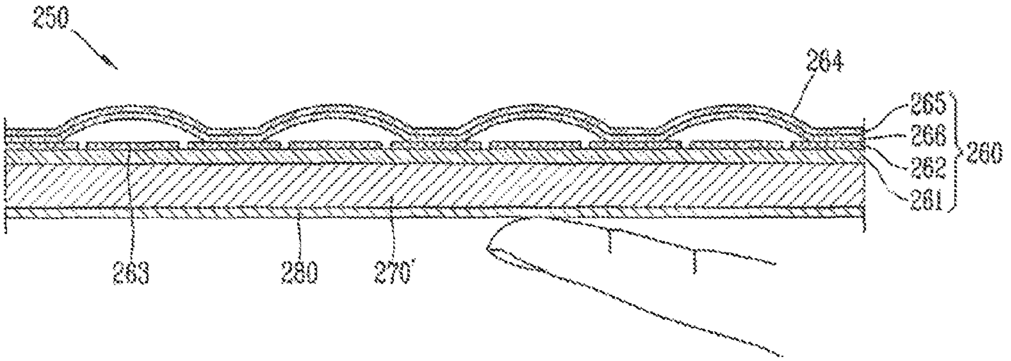
FIG. 7 is a sectional view of another example of a mobile terminal according to an exemplary embodiment of the present invention.

FIG. 7 is a sectional view of another example of a mobile terminal according to an exemplary embodiment of the present invention.

As shown in FIG. 7, a keypad device 250 of the mobile terminal includes a transparent display unit 270' and a touch sensing layer 280 at a lower portion of the light-transmissive keypad 260. Namely, because the transparent display unit 270' is transparent, an object at a rear surface thereof can be seen, while outputting visual information. The transparent display unit 270' may be implemented by a known display device.

A touch sensing unit 280 is installed to allow for inputting in a tactile manner in addition to the push type input method at the front side. For example, an inputting operation is performed by pressing the dome part 264 of the actuator 265 with the user's thumb at the front side of the mobile terminal 200, and inputting is performed in a tactile manner with one of the other fingers excluding thumb at the rear side of the mobile terminal. Through this multiple inputting methods, the user interface can be more diversified and become convenient.

Figure 8:
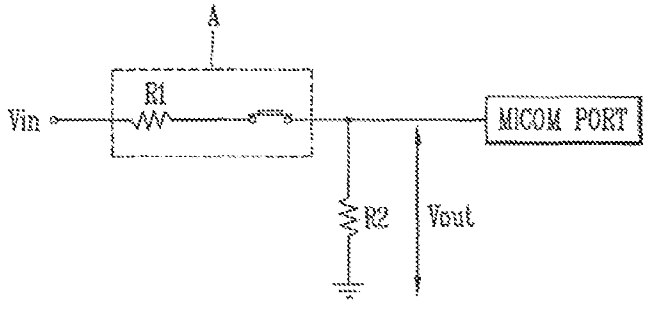
FIG. 8 is a conceptual circuit diagram showing a method for correcting a high resistance deviation in processing an electrical signal of the light-transmissive keypad according to an exemplary embodiment of the present invention.

FIG. 8 is a conceptual circuit diagram showing a method for correcting a high resistance deviation in processing an electrical signal of the light-transmissive keypad according to an exemplary embodiment of the present invention.

Because the conductive coating layer 266 of the light-transmissive keypad 260 and the first and second electrode patterns 263 are formed by carbon nano-tube (CNT) or the like, the resistance generated from a contact surface between the conductive coating layer 266 of the actuator 265 and the first and second electrode patterns 263 and an operational resistance generated when the actuator 265 is pressed are problematic. For example, a measured resistance of the former was 0.5 to 1 kΩ, and that of the latter was 20 to 300 kΩ). In the latter case, the increase in the overall resistance value according to the length of the pattern according to the position of each key was reflected.

In FIG. 8, R1 is the operational resistance of the latter, namely, the resistance according to the length of the pattern included in a corresponding key when the actuator 265 is pressed.

In order to minimize a voltage variation (difference between voltages measured according to which key is pressed) due to a high resistance value, an additional resistance corrector R2 is installed at an input port (MICOM PORT), thus lowering the voltage variation with respect to the resistance variation of each actuator 265 to a neglectable level. Thus, even when the resistance value generated from each actuator 265 is a maximum 400 kΩ, it is recognized such that there is little voltage variation.

Figure 9:
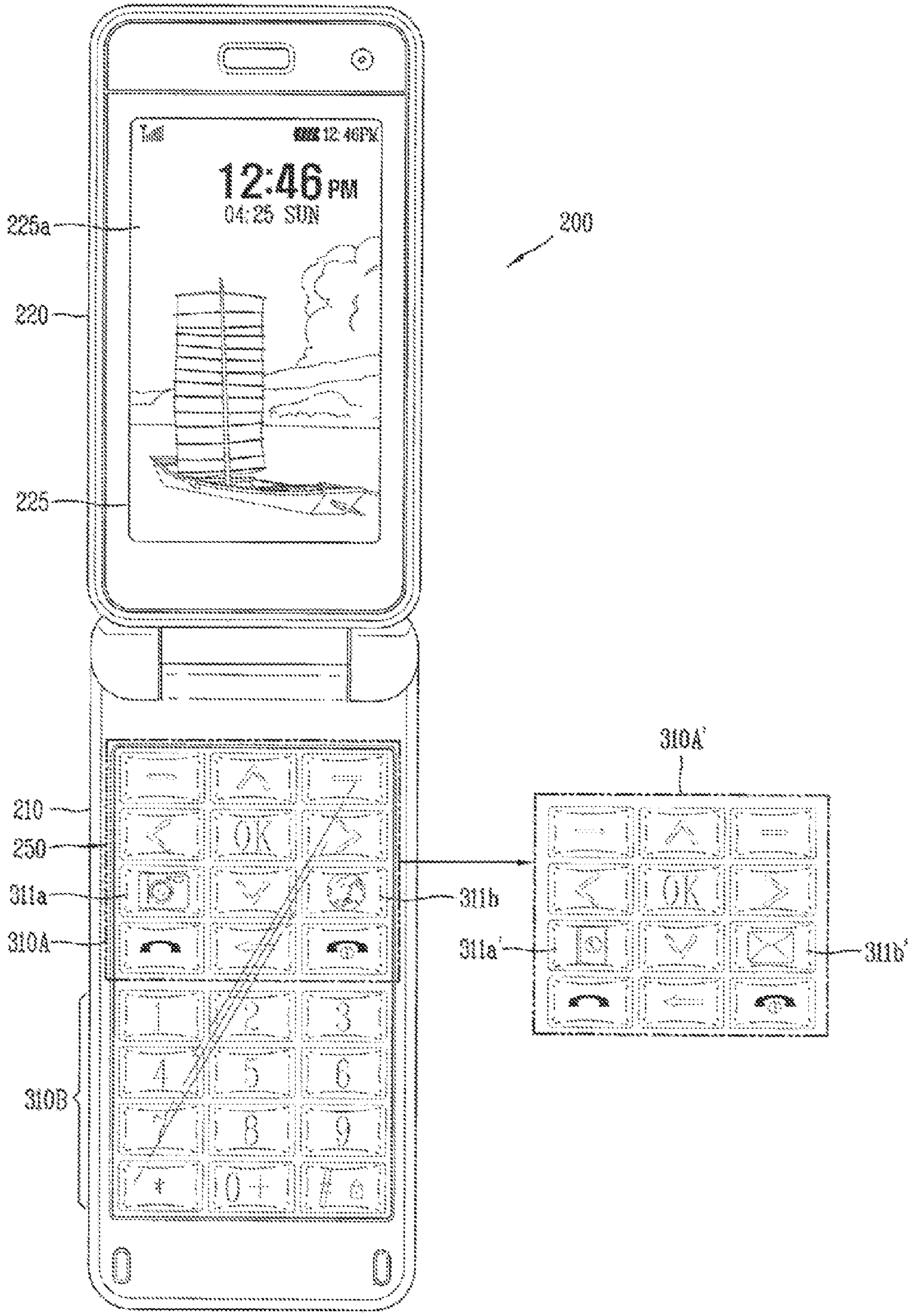
FIG. 9 is a view showing an operational state of a first user interface implemented by the keypad device according to an exemplary embodiment of the present invention.

FIG. 9 is a view showing an operational state of a first user interface implemented by the keypad device according to an exemplary embodiment of the present invention.

The keypad device 250 allows for an inputting operation in a push manner physically and has a transparent keypad (260 in FIGS. 4 and 5), and the display unit (270 in FIGS. 4 and 5) are disposed at lower side of the transparent keypad 260.

In regard to area, the respective keys constituting the keypad device 250 may be disposed as groups according to their characteristics. As shown in FIG. 9, the keypad device 250 includes two areas, namely, a function key set 310A and a number key set 310B. Here, key marks 311*a* and 311*b* identifying each key in the function key set 310A and key marks 311*c* (See FIG. 10) identifying each key in the number key set 310B are outputs of the display unit 270. Thus, the key marks

311*a* and 311*b* identifying each key in the function key set 310A and key marks 311*c* identifying each key in the number key set 310B may change according to a mode of the display unit 270 or a controlling operation of the controller 180.

For example, as shown in FIG. 9, particular key marks 311*a* and 311*b* in the function key set 310A are changed to key marks 311*a*' and 311*b*' in the function key set 310A. Such a change may be made through a setting menu of the key marks or may be automatically changed according to a previously stored control function.

Figure 10:
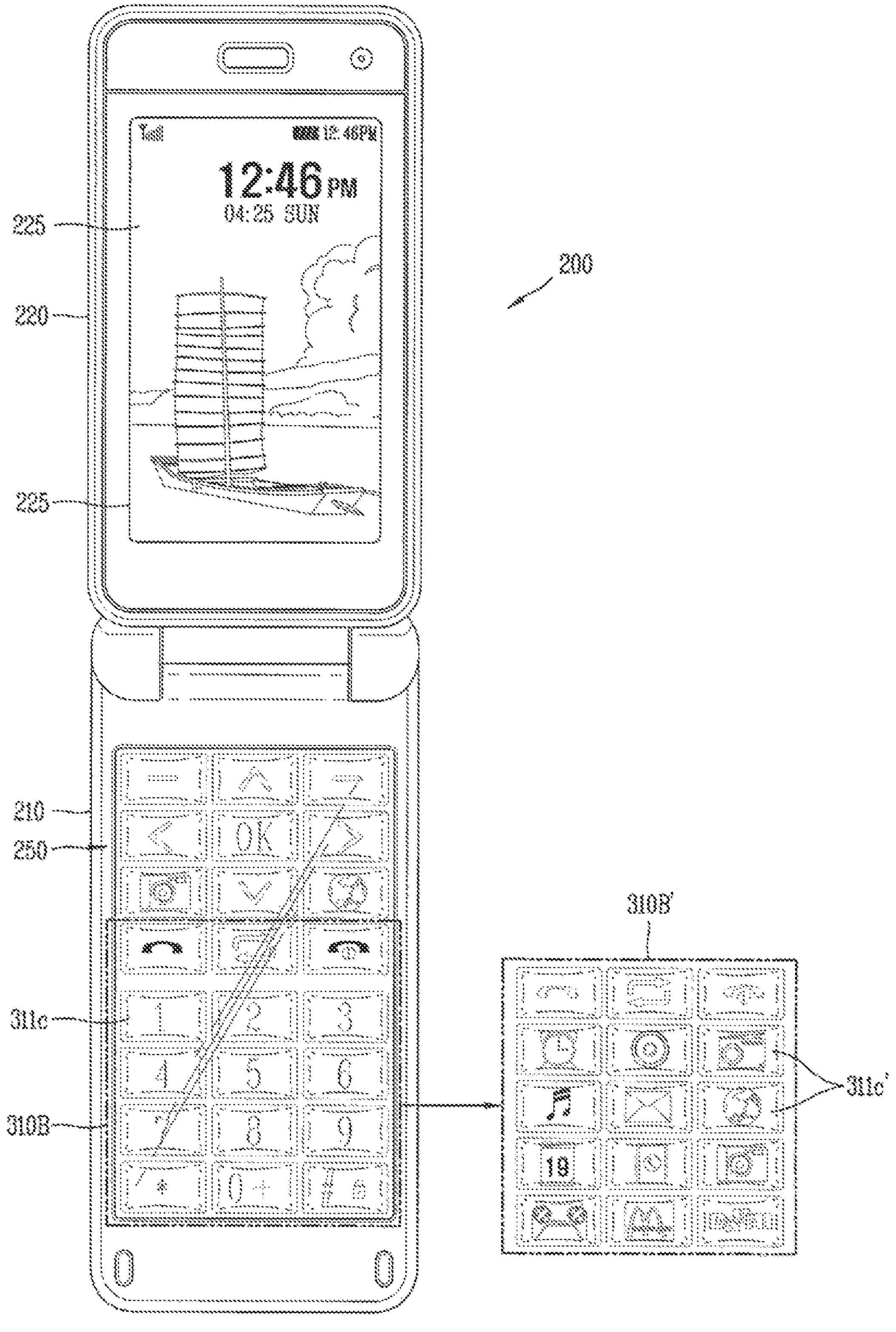
FIG. 10 is a view showing an operational state of a second user interface implemented by the keypad device according to an exemplary embodiment of the present invention.

FIG. 10 is a view showing an operational state of a second user interface implemented by the keypad device according to an exemplary embodiment of the present invention. As shown in FIG. 10, respective key marks of the number key set 310B are changed to be outputted as key marks 311*c*' of the changed set 310B'. Namely, the respective key marks 311*c* constituting the number key set 310B are changed to new key marks 311*c*', and in this sense, the keypad of the present invention is different from the conventional keypad.

Through the method of changing the key marks, the key marks of the keys constituting the keypad device 250 can be adjusted as desired according to a mode. For example, the user may set a frequently used hot key (e.g., a multimedia, broadcast, Web page access key, and the like) in a general mode, whereby the function, that should be performed by inputting keys several times, may be implemented by pressing a key one time.

Figure 11:
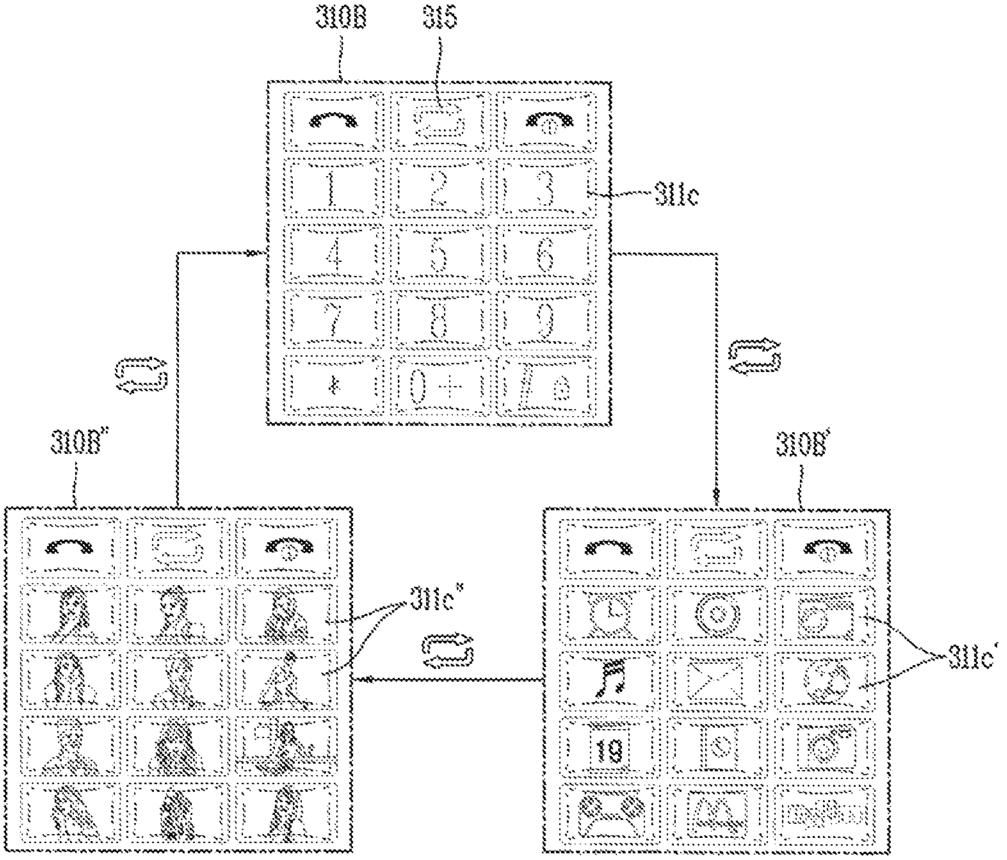
FIG. 11 is a view showing an operational state of a method for changing key marks by the keypad device according to an exemplary embodiment of the present invention.

FIG. 11 is a view showing an operational state of a method for changing key marks by the keypad device according to an exemplary embodiment of the present invention. As shown in FIG. 11, a first set 310B having number keys 311*c* is changed as a change key 315 included therein is pressed. Namely, the key set indicated by 310B includes number keys 311*c* and the change key 315, and when the change key 315 is pressed one time, a different type second key set 310B' is displayed. The respective keys in the changed key set 310B' are displayed according to a user setting or according to an automatic change procedure. The change key may be set as a side key or the like, not in the keypad unit 250.

When the change key 315 is pressed in the state of the second key set 310B', a different type of third key set 310B" is displayed. The third key set 310" may be each phone book or album displayed in the form of thumbnail images as shown in FIG. 11.

Because the number key or the hot key cannot show several key marks at a time, the method of changing the respective key marks is employed, and according to this method, the several key marks can be simply changed according to circumstances so as to be used.

Figure 12:
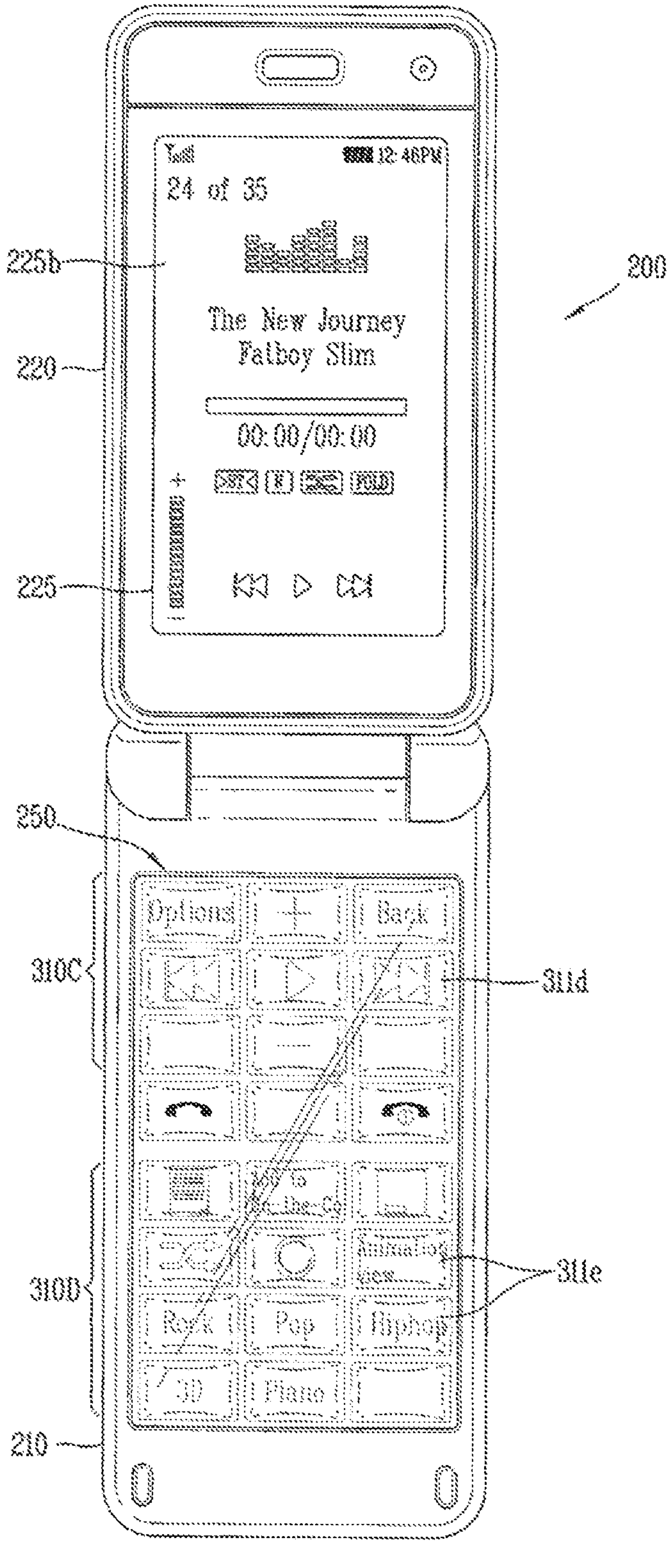
FIG. 12 is a view showing an operational state of a third user interface implemented by the keypad device according to an exemplary embodiment of the present invention.

FIG. 12 is a view showing an operational state of a third user interface implemented by the keypad device according to an exemplary embodiment of the present invention.

When a particular application is being executed, functions related to the application may be displayed for user convenience. For example, the application may include various applications such as a music player, a video player, and a text message creator. Thus, when one application is being executed, it may be configured such that key marks output the functions related to the corresponding application. As shown in FIG. 12, when the music player is executed, at least one set 310C, 310D of key marks corresponding to the functions related to music are output. Key marks 311*d* for executing the functions such as reproduction/stop, next music/previous music, sound volume up/down, and the like, are included in the key set indicated by 310C, and different types of key marks 311*e* related to reproduction of music are included in a key set indicated by 310D. Meanwhile, the second display unit 225 of the second body 220 outputs contents 225*b* related to music player application.

The video player may display a key set similar to that of the music player, and in the case of the text message creator, function keys related to editing of characters may be set. Since several pressing operations (i.e., clicking operation) for executing the relevant functions can be reduced to pressing single press operation, the manipulation can become convenient and time can be reduced.

Figure 13:
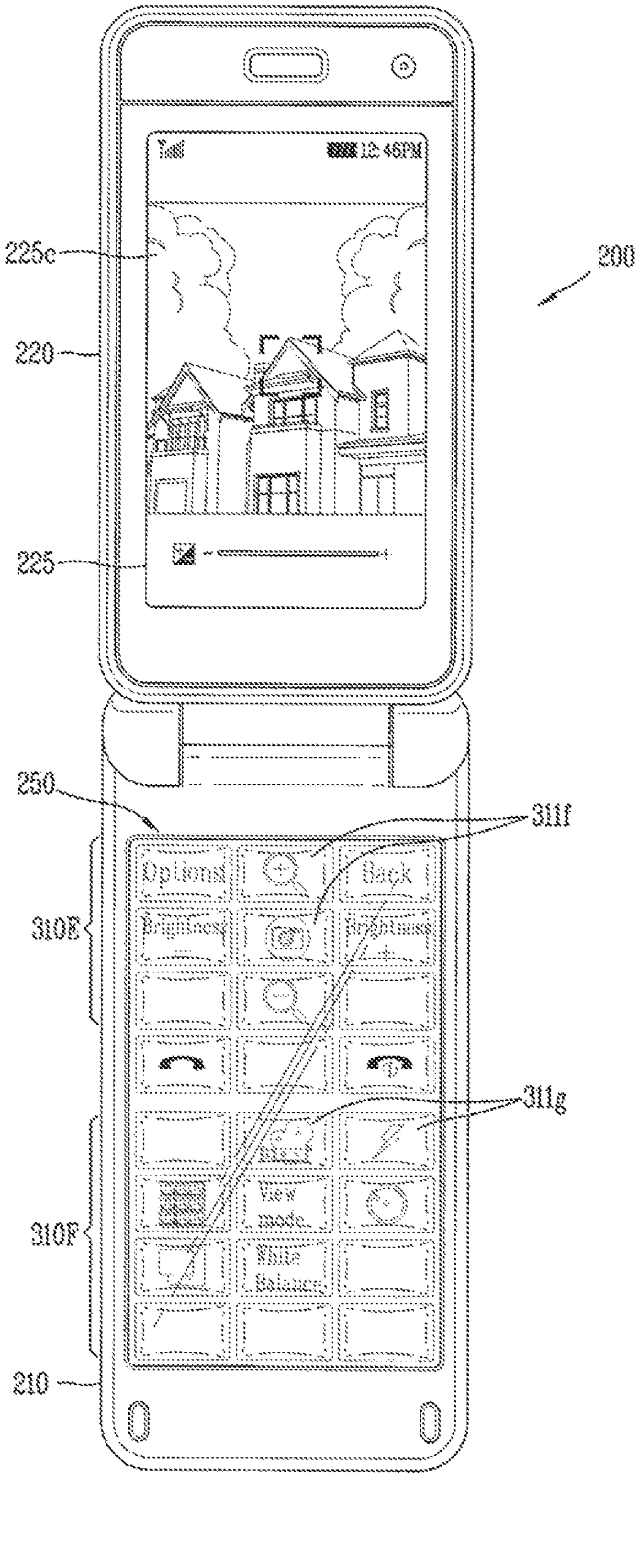
FIG. 13 is a view showing an operational state of a fourth user interface implemented by the keypad device according to an exemplary embodiment of the present invention.

FIG. 13 is a view showing an operational state of a fourth user interface implemented by the keypad device according to an exemplary embodiment of the present invention. In FIG. 13, when a camera function is executed, the keypad device 250 collectively outputs key marks 311*f*, 311*g* corresponding to functions related to the camera 121.

The second display unit 225 of the second body 220 outputs the image of a subject 225*c* to be captured in the form of a view finder. In addition to the image to be captured, the image of the subject can be also output through the display unit 270 included in the keypad device 250.

Figure 14:
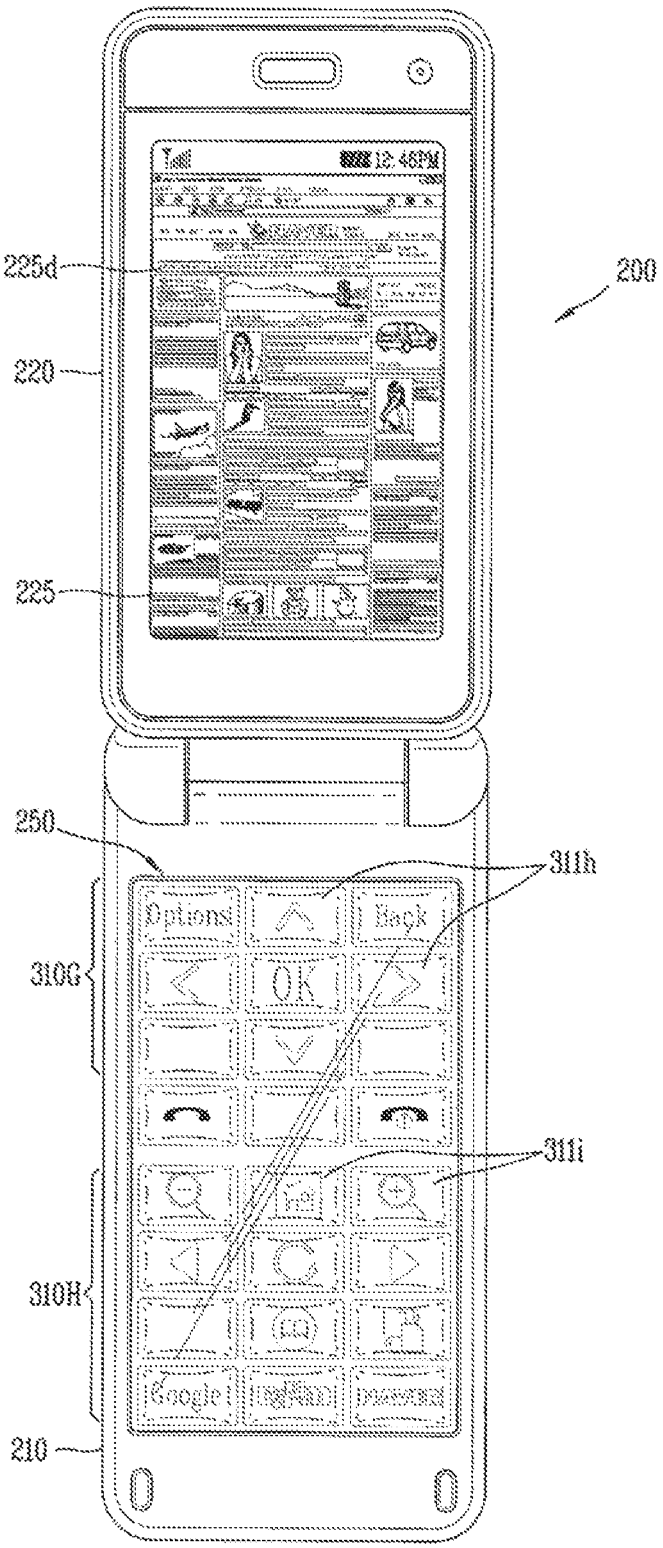
FIG. 14 is a view showing an operational state of a fifth user interface implemented by the keypad device according to an exemplary embodiment of the present invention.

FIG. 14 is a view showing an operational state of a fifth user interface implemented by the keypad device according to an exemplary embodiment of the present invention. In FIG. 14, when a Web browser function is executed, the keypad device 250 collectively outputs key marks 311*h*, 311*i* corresponding to functions related to Web browsing.

The second display unit 225 of the second body 220 outputs a Web page 225*d*. However, rather than the sets 310G, 310H of the key marks 311*h*, 311*i*, a current or previous Web page may be output through the display unit 270 included in the keypad device 250.

Figure 15:
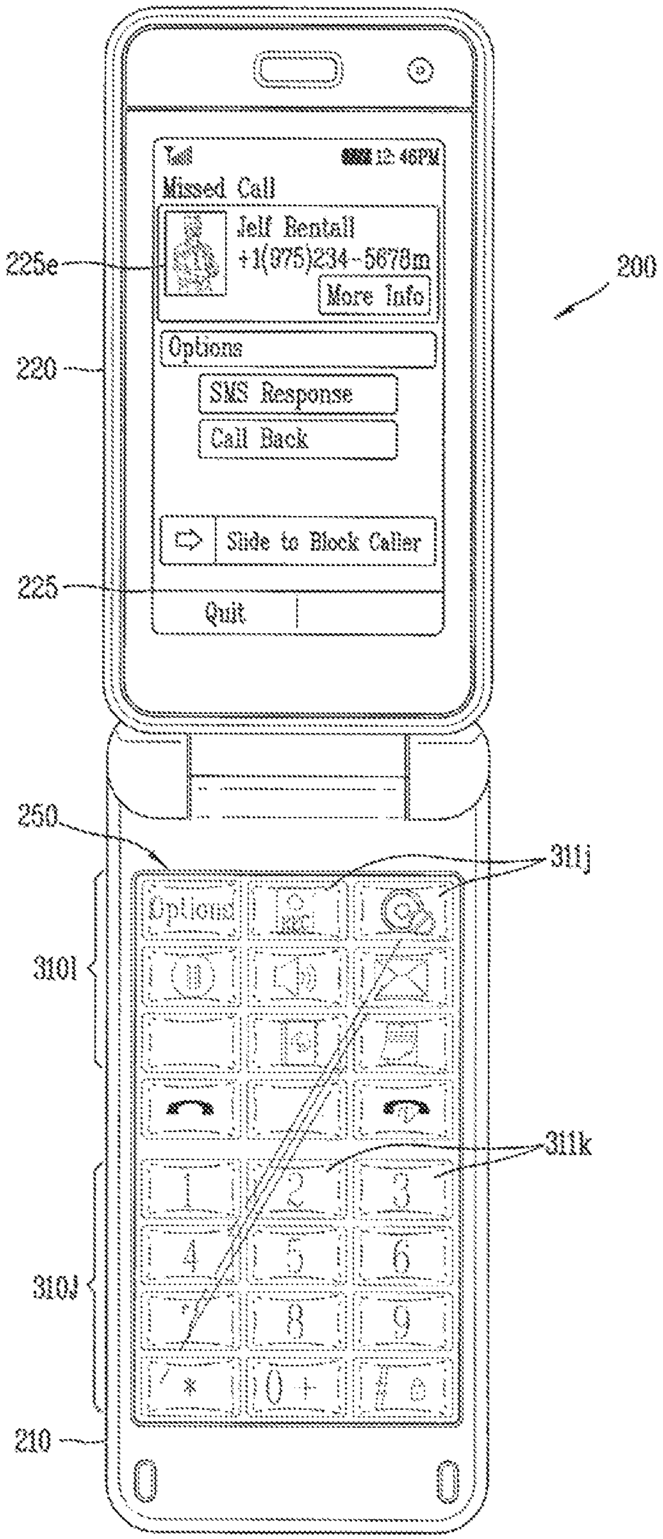
FIG. 15 is a view showing an operational state of a sixth user interface implemented by the keypad device according to an exemplary embodiment of the present invention.

FIG. 15 is a view showing an operational state of a sixth user interface implemented by the keypad device according to an exemplary embodiment of the present invention. In FIG. 15, when a call is executed, the keypad device 250 collectively outputs key marks 311*j*, 311*k* corresponding to functions related to making a call. For example, a first set 310*l* of the key marks 311*j* may be related to communication functions and a second set 310J of the key marks 311*k* may include number keys for dialing a phone number to place a call or for entering information such as phone numbers. The second display unit 225 of the second body 220 outputs information 225*e* related to the call function.

Figure 16:
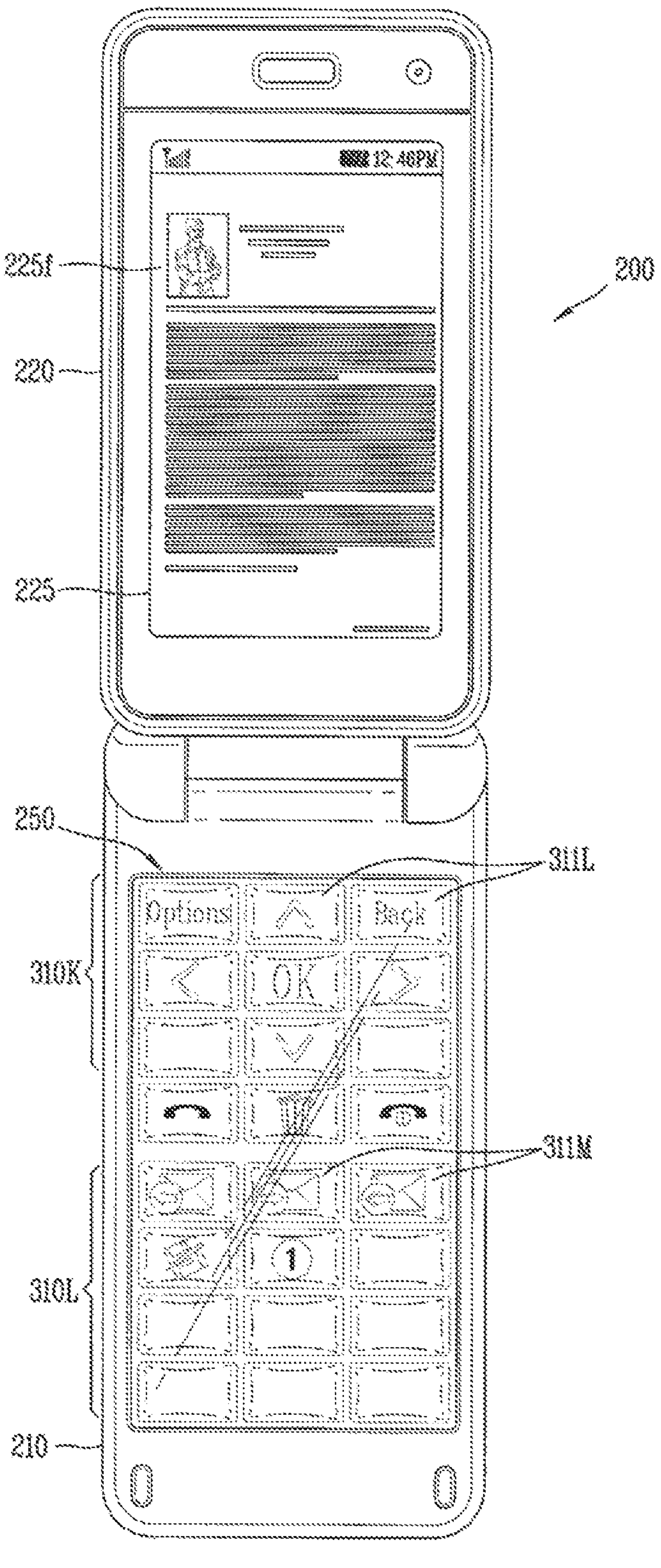
FIG. 16 is a view showing an operational state of a seventh user interface implemented by the keypad device according to an exemplary embodiment of the present invention.

FIG. 16 is a view showing an operational state of a seventh user interface implemented by the keypad device according to an exemplary embodiment of the present invention. In FIG. 16, when a message function is executed, the keypad device 250 collectively outputs key marks 311L, 311M corresponding to messaging functions. The second display unit 225 of the second body 220 outputs a screen 225*f* related to the message function.

In one aspect of the present invention, a set of key marks that are directly related to a phone call, such as a key mark 333 for receiving an incoming call and a key mark 335 for ending a call, may be displayed all the time via the keypad device 250. For example, see FIG. 9 and FIGS. 10-16. Such a configuration will allow the user to receive or finish the call easily without interrupting other functions that are being executed on the mobile terminal 200.

Figure 17:
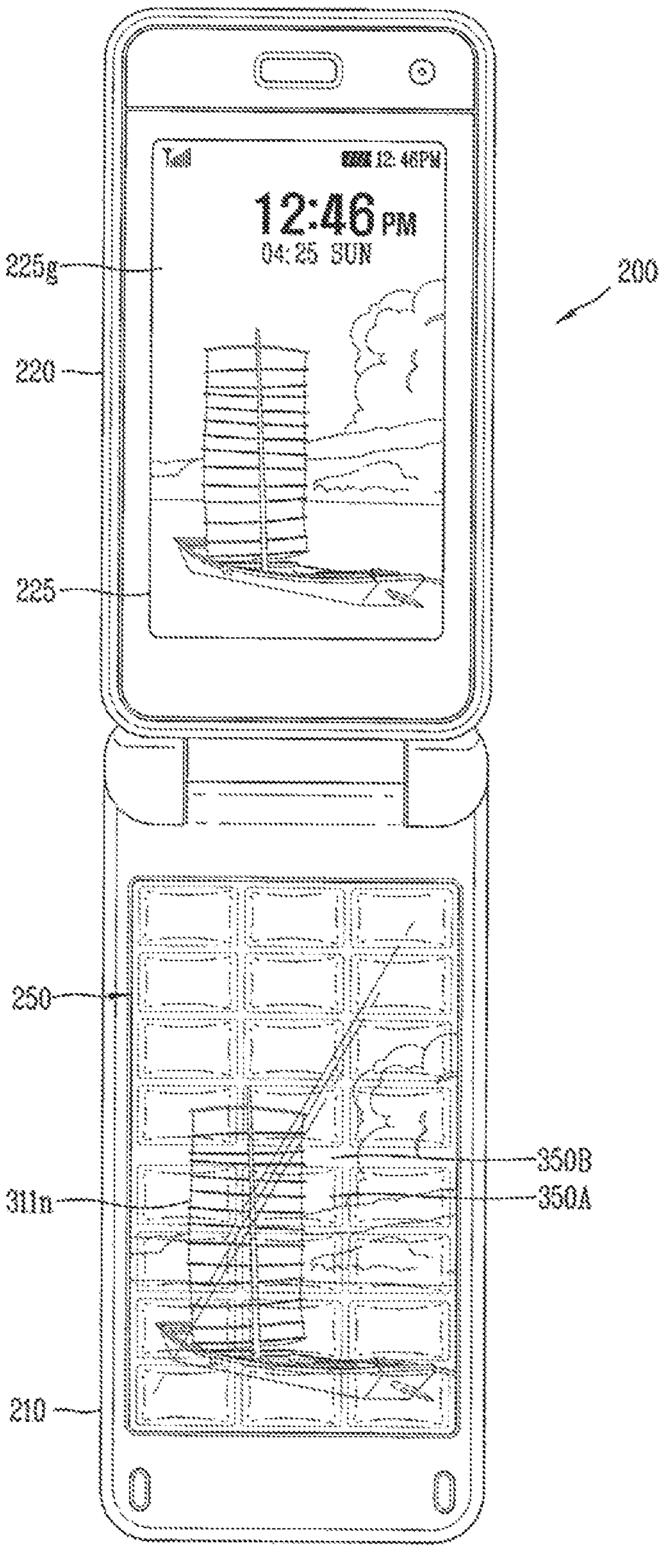
FIG. 17 is a view showing an operational state of a eighth user interface implemented by the keypad device according to an exemplary embodiment of the present invention.

FIG. 17 is a view showing an operational state of a eighth user interface implemented by the keypad device according to an exemplary embodiment of the present invention. In FIG. 17, the display unit 270 of the keypad device 250 is used together with the display unit 225 of the second body 220 to implement a dual-display.

In general, the display area of a small electronic device such as a mobile terminal or the like is small, so in order to overcome this, in the present exemplary embodiment, the keypad device 250 is used to provide various screen image outputs.

As shown in FIG. 17, background images of the display unit 225 of the second body 220 and the display unit 270 of the keypad device 250 of the first body 210 are outputted. In this case, the respective keys constituting the keypad device 250 of the first body 210 may be changed according to various modes as described above.

To this end, the keypad device 250 of the first body 210 includes a plurality of first areas 350A corresponding to the light-transmissive dome keys and second areas 350B around the first areas. The background image may be applied to both the first areas 350A and the second areas 350B and the key marks constituting the key set may be changed according to the modes as described above.

Figure 18:
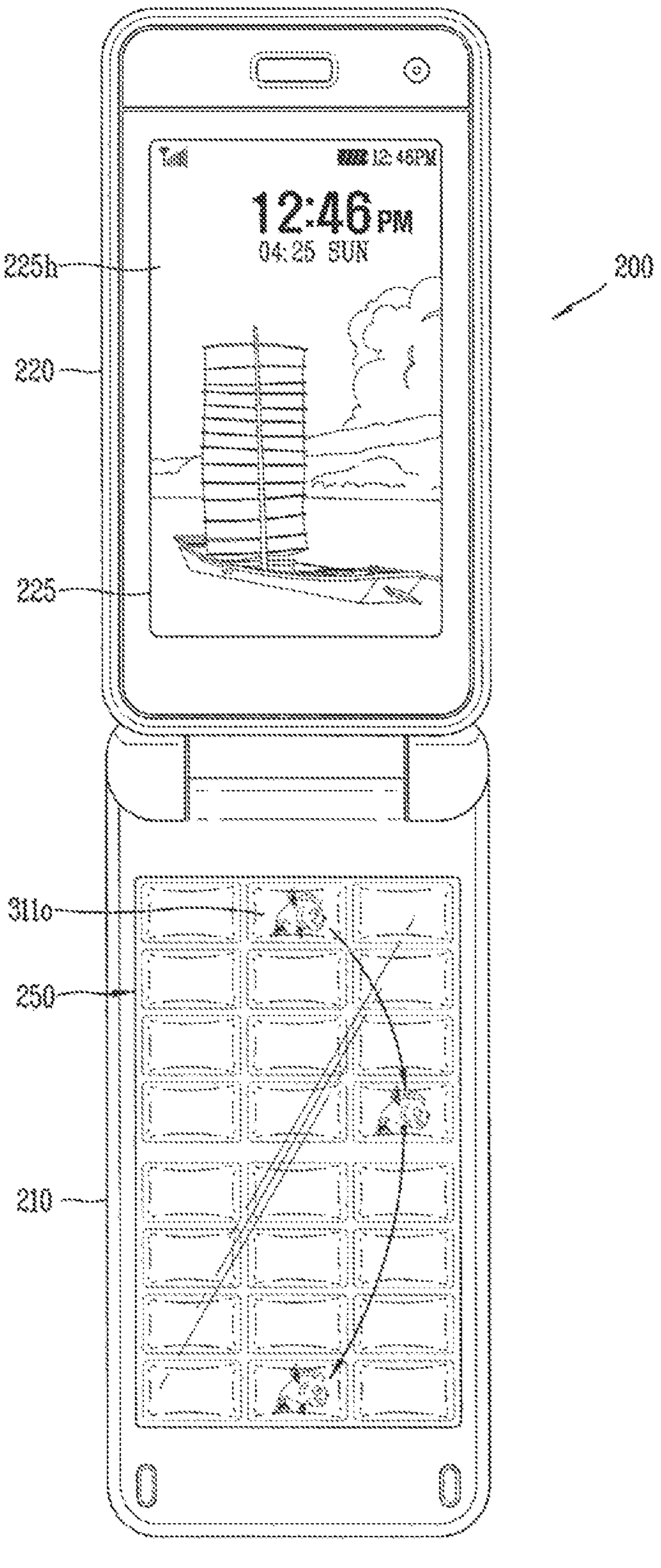
FIG. 18 is a view showing an operational state of a ninth user interface implemented by the keypad device according to an exemplary embodiment of the present invention.

FIG. 18 is a view showing an operational state of a ninth user interface implemented by the keypad device according to an exemplary embodiment of the present invention. In FIG. 18, the display unit 270 of the keypad device 250 is used together with the display unit 225 of the second body 220 to implement a dual-display.

In FIG. 18, the screen image outputted through the keypad device 250 is a screen saver, in which a moving object (a fish FIG. 310*o* in FIG. 18) moves from one key to another key. In a state that the fish is currently outputted to a certain key, when the user presses the key, the fish is moved to a different key, having the effect as if the fish reacts to the key pressing.

Figure 19:
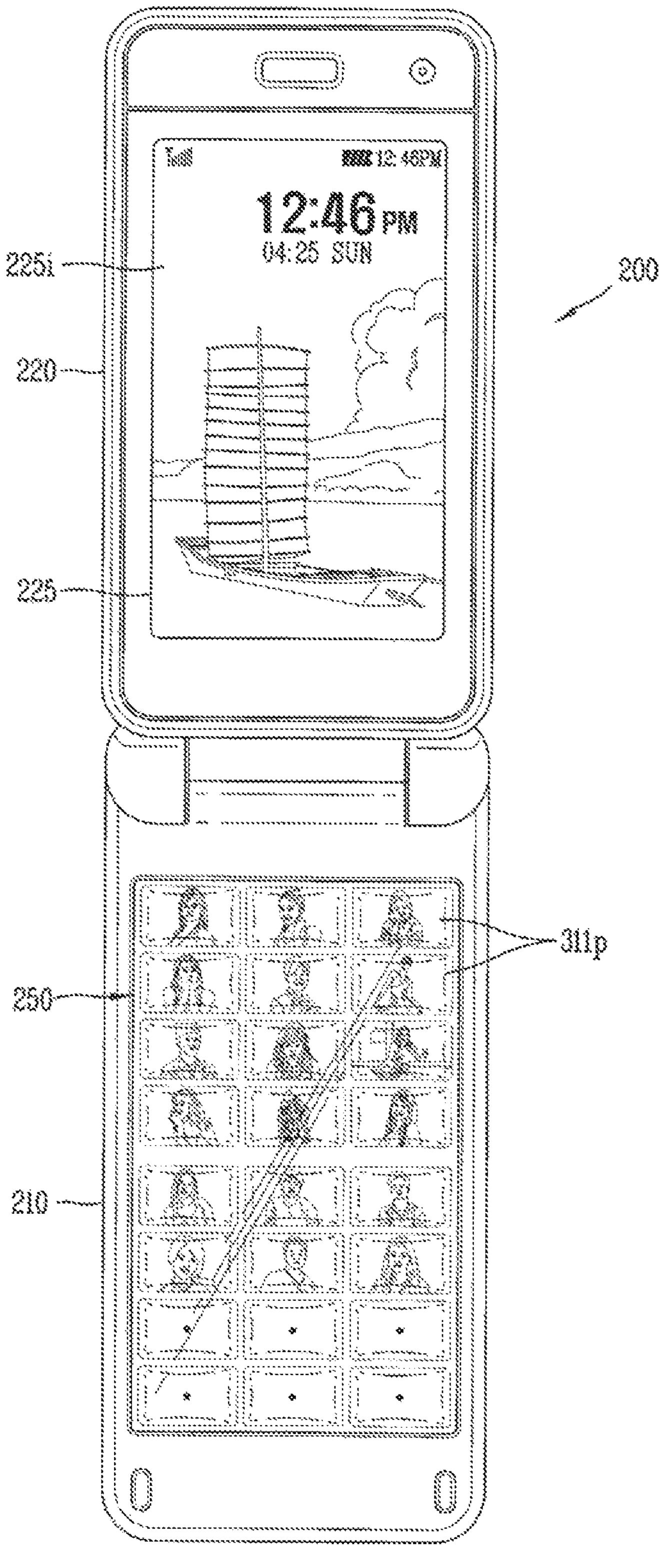
FIG. 19 is a view showing an operational state of a tenth user interface implemented by the keypad device according to an exemplary embodiment of the present invention.

FIG. 19 is a view showing an operational state of a tenth user interface implemented by the keypad device according to an exemplary embodiment of the present invention. In FIG. 19, the display unit 270 of the keypad device 250 is used together with the display unit 225 of the second body 220 to implement a dual-display.

In FIG. 19, a screen image outputted through the keypad device 250 is a photo album, in which the character photo images are outputted to the respective keys of the keypad device 250. Accordingly, when a key is pressed with respect to a character in the photo image while viewing the photo images in the photo album, a call may be made to the corresponding character or the photo image can be transmitted as a message.

Figure 20:
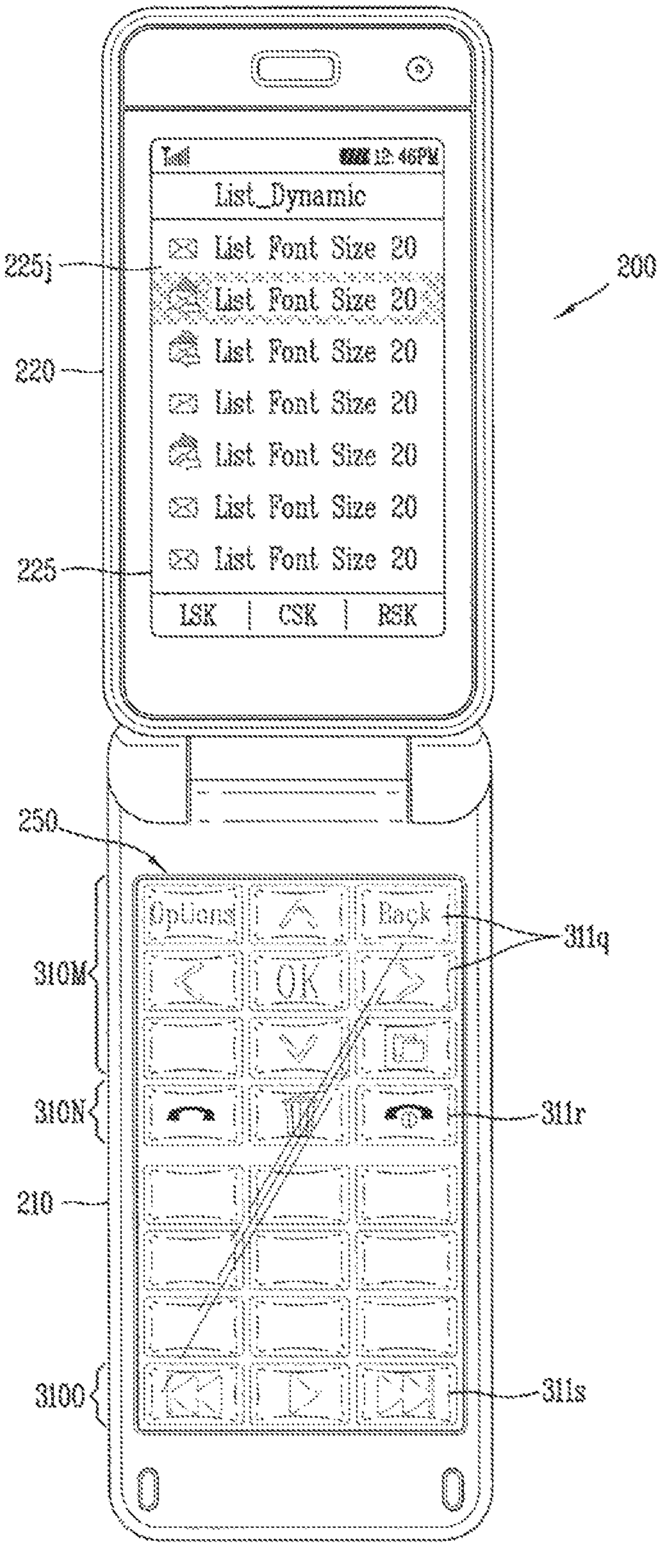
FIG. 20 is a view showing an operational state of a eleventh user interface implemented by the keypad device according to an exemplary embodiment of the present invention.

FIG. 20 is a view showing an operational state of an eleventh user interface implemented by the keypad device according to an exemplary embodiment of the present invention. In FIG. 20, the music player is constantly displayed by using a dynamic keypad print. Some of the keys may be used as music reproduction buttons by using the dynamic key marks on the screen, whereby music selection or reproduction manipulation can be made immediately no matter which application is executed.

In FIG. 20, a first set 301M includes a navigation and a soft key button 311*q*, and a second set 310N indicates a deletion and send/end command 311*r*. A third set 310O includes a simple music controller 311*s*.

Figure 21:
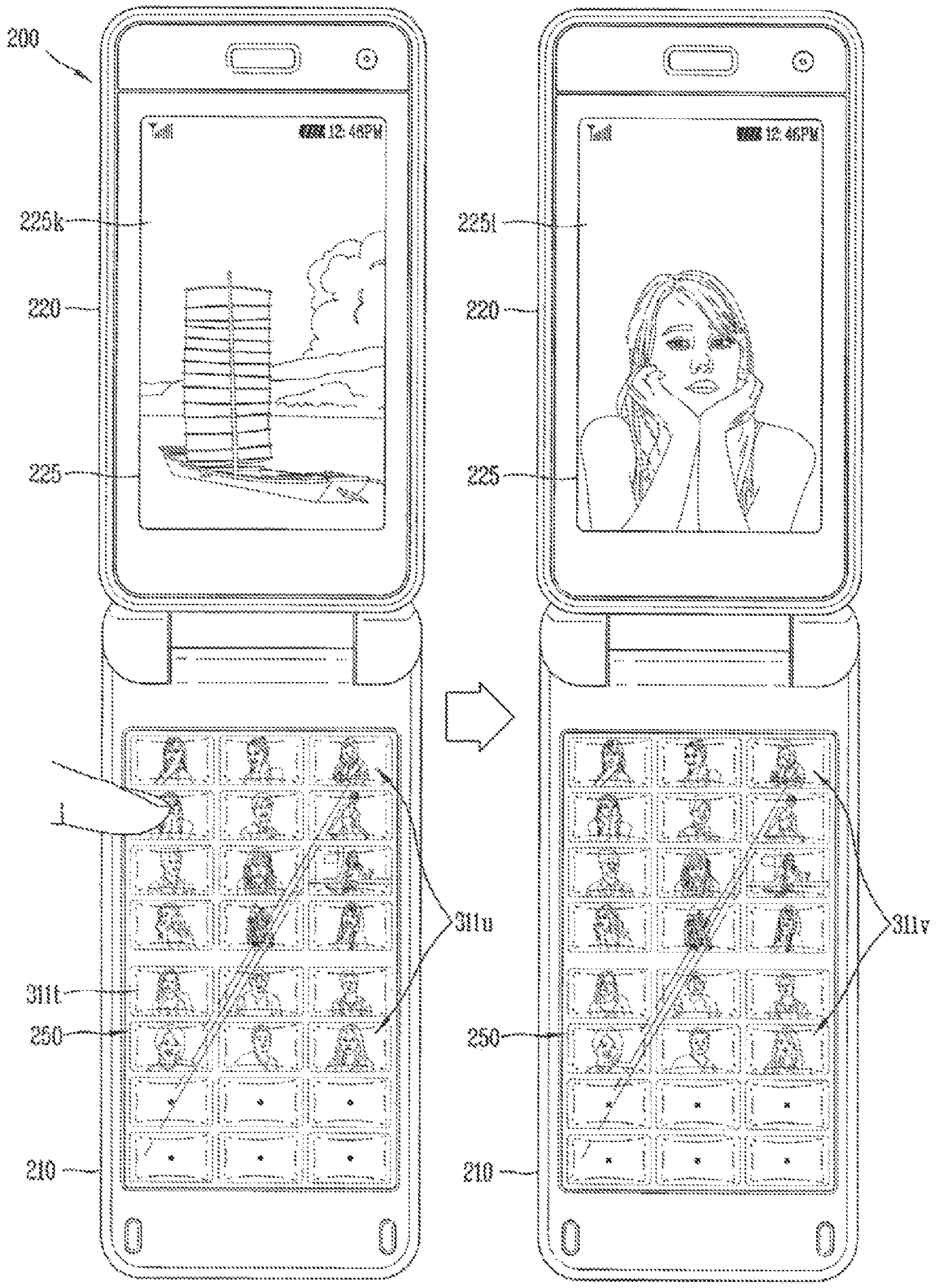
FIG. 21 is a view showing an operational state of a twelfth user interface implemented by the keypad device according to an exemplary embodiment of the present invention.

FIG. 21 is a view showing an operational state of a twelfth user interface implemented by the keypad device according to an exemplary embodiment of the present invention. In FIG. 21, a previous photo image or a next photo image of the photo album are displayed on the respective key marks constituting the keypad device 250, allowing for a fast navigation. Namely, in FIG. 21, as described above, the display unit 270 of the keypad device 250 is used together with the display unit 225 of the second body 220 to implement a dual-display.

Figure 22A:
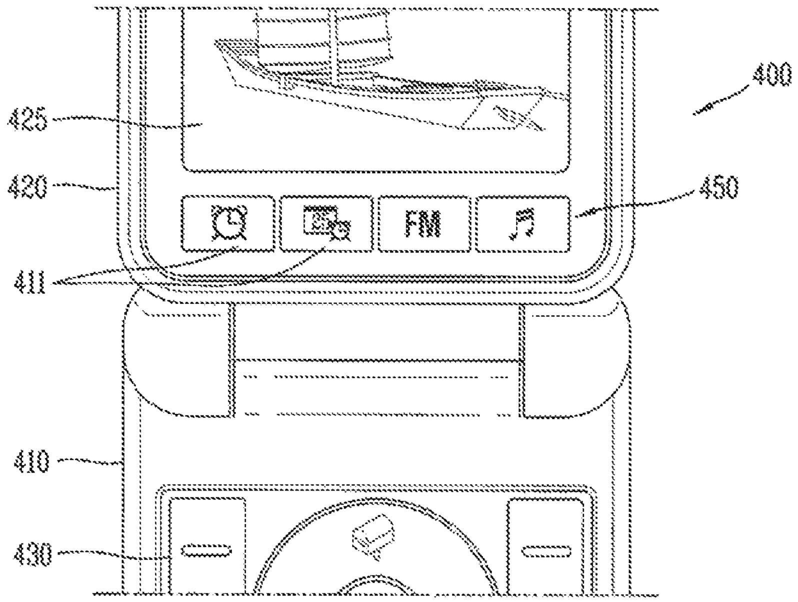
FIGS. 22A to 22C are partial front views of another example of the mobile terminal employing the keypad device according to an exemplary embodiment of the present invention.
Figure 22B:
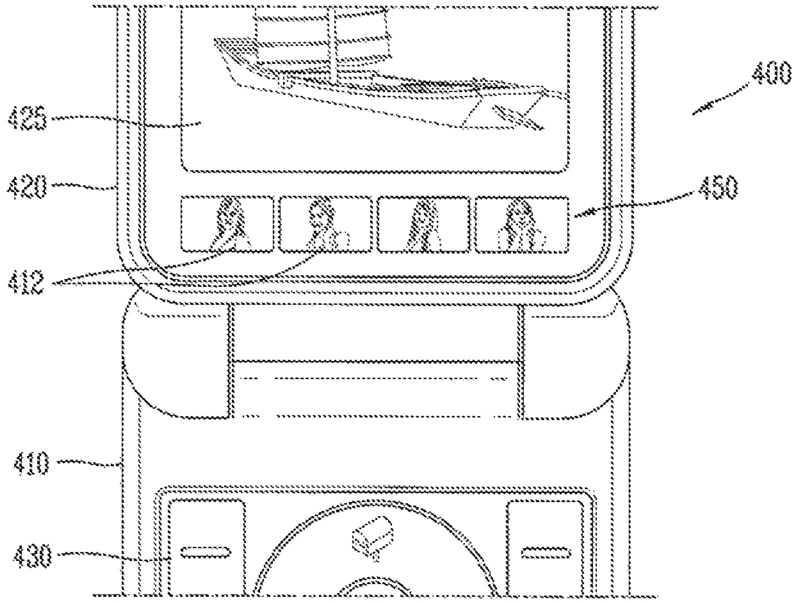
Figure 22C:
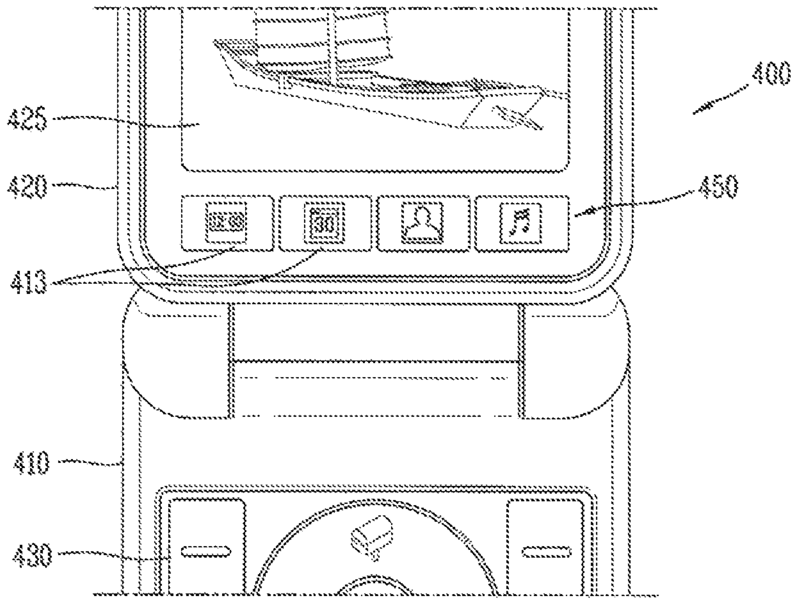

FIGS. 22A to 22C are partial front views of another example of the mobile terminal employing the keypad device according to an exemplary embodiment of the present invention. In FIG. 22, a mobile terminal 400 includes a first body 210 having the conventional keypad device 430 and a second body 220 configured to be foldable with respect to the first body 210. A keypad device 450 according to an exemplary embodiment of the present invention is installed at one side of a display unit 425 constituting the most part of the second body 220.

The keypad device 450 may include the light-transmissive keypad 260 and the display unit 270 as described above. Thus, a detailed description thereof will be omitted. The display unit disposed at a lower side of the light-transmissive keypad 260 may be formed to be separated from the second display unit 425 or may be implemented by extending the second display unit 425. In particular, in the latter case, the fabrication is simplified and the cost can be reduced.

In FIG. 22A, the keypad device 450 is set in an initial state. The respective key marks 411 of the keypad device 450 may be changed through setting or the like.

FIGS. 22B and 22C show a keypad device having key marks changed from those of the keypad device 450. Namely, the user can directly set a hot key through the keypad device 450 according to an exemplary embodiment of the present invention, and the user may simply change the key marks of the hot key and quickly and easily recognize the changed functions in using it.

As described above, in the mobile terminal according to an exemplary embodiment of the present invention, the light-transmissive keypad having good click sense is disposed at the upper portion of the display unit, and the key marks identifying the respective keys constituting the keypad can be variably changed through the display unit without the necessity of forming them in a fixed form. Thus, appropriate key sets may be outputted according to various modes, and the user inconvenience of performing clocking several times in order to execute a particular function in a corresponding mode can be reduced. In addition, the keypad device provides various and convenient user interfaces.

In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. An apparatus, comprising:

a key pad device, comprising:

a light-transmissive actuator having a plurality of dome-shaped first areas and a plurality of second areas adjacent each of the plurality of first areas, wherein the plurality of dome-shaped first areas comprise an exposed surface to permit direct user contact with each of the plurality of dome-shaped first areas;

a conductive coating layer formed of a light-transmissive material and disposed on an inner surface of the actuator;

a light-transmissive base having a first light-transmissive electrode pattern and a second light-transmissive electrode pattern formed on a top side of the base, the first light-transmissive electrode pattern being configured to always be in contact with first areas of the coating layer corresponding to edge portions of the plurality of first areas, and the second light-transmissive electrode pattern being configured to be in contact with second areas of the coating layer corresponding to substantial portions of the plurality of first areas only when the actuator is pressed;

a display comprising a top side and an opposing bottom side, wherein the display is light-transmissive and is coupled to a bottom side of the base; and a touch sensing layer coupled to the bottom side of the display, wherein the display is configured to display visual information that is simultaneously viewable from both the top side and the bottom side of the display, such that the visual information is viewable through the actuator, the coating layer, and the base, wherein the visual information is also viewable through the touch sensing layer, wherein the visual information comprises a plurality of key marks accessible via the plurality of dome-shaped first areas and the touch sensing layer wherein a first set of key marks, of the plurality of key marks, is displayed when a first application is executed at the apparatus, wherein the first set of key marks is dynamically changed to a second set of key marks that is different from the first set of key marks when the apparatus terminates the first application, wherein the first set of key marks relate to functions associated with the first application and the second set of key marks relate to functions associated with a second application executed at the apparatus, wherein the first application is different from the second application, wherein the keypad device, with the light-transmissive actuator formed on top of the keypad device and the touch sensing layer formed on bottom of the keypad device, is configured to receive a push type input on the top of the keypad device simultaneously with a tactile input to the bottom of the keypad device, and wherein a portion of the first light-transmissive electrode pattern brought into contact with edges of dome parts of the actuator is thicker than other portions of the first light-transmissive electrode pattern so that it is not abraded due to a repeated pressing of the actuator.

2. The apparatus of claim 1, wherein the visual information comprises multiple visual information that is displayed only via the plurality of first areas of the actuator and the plurality of second areas are configured to be a boundary that separates each of the plurality of first areas.

3. The apparatus of claim 2, wherein the multiple visual information comprises at least a thumbnail image, an icon, or a character that is displayed via a respective one of the plurality of first areas.

4. The apparatus of claim 3, wherein each of the plurality of first areas is configured as a key for receiving user input.

5. The apparatus of claim 1, wherein the coating layer and the first and second electrode patterns are made of light-transmissive carbon nano-tube (CNT) or light-transmissive conductive polymer.

6. The apparatus of claim 5, further comprising:

a resistance corrector configured to correct deviation of resistance according to a length corresponding to a portion of the first and second electrode patterns when at least one of the plurality of first areas is pressed such that the portion is in contact with the actuator.

7. The apparatus of claim 1, further comprising a cover layer that is disposed on an outer surface of the actuator, the cover layer comprising a plurality of openings through which the plurality of first areas are exposed.

8. A mobile terminal comprising:

a first body having a first display and a keypad; and a second body coupled to the first body, wherein the keypad comprises:

a light-transmissive actuator having a plurality of dome-shaped first areas and a plurality of second areas adjacent each of the plurality of first areas, wherein the plurality of dome-shaped first areas comprise an exposed surface to permit direct user contact with each of the plurality of dome-shaped first areas;

a conductive coating layer formed of a light-transmissive material and disposed on an inner surface of the actuator;

a light-transmissive base having a first light-transmissive electrode pattern and a second light-transmissive electrode pattern formed on a top side of the base, the first light-transmissive electrode pattern being configured to always be in contact with first areas of the coating layer corresponding to edge portions of the plurality of first areas, and the second light-transmissive electrode pattern being configured to be in contact with second areas of the coating layer corresponding to substantial portions of the plurality of first areas only when the actuator is pressed;

a second display comprising a top side and an opposing bottom side, wherein the second display is light-transmissive and is coupled to a bottom side of the base; and a touch sensing layer coupled to the bottom side of the second display, wherein the second display is configured to display visual information that is simultaneously viewable from both the top side and the bottom side of the display, such that the visual information is viewable through the actuator, the coating layer, and the base, wherein the visual information is also viewable through the touch sensing layer, wherein the visual information comprises a plurality of key marks accessible via the plurality of dome-shaped first areas and the touch sensing layer, wherein a first set of key marks, of the plurality of key marks, is displayed when a first application is executed at the mobile terminal, wherein the first set of key marks is dynamically changed to a second set of key marks that is different from the first set of key marks when the mobile terminal terminates the first application, wherein the first set of key marks relate to functions associated with the first application and the second set of key marks relate to functions associated with a second application executed at the mobile terminal, wherein the first application is different from the second application, wherein the keypad device, with the light-transmissive actuator formed on top of the keypad device and the touch sensing layer formed on bottom of the keypad device, is configured to receive a push type input on the top of the keypad device simultaneously with a tactile input to the bottom of the keypad device, and wherein a portion of the first light-transmissive electrode pattern brought into contact with edges of dome parts of the actuator is thicker than other portions of the first light-transmissive electrode pattern so that it is not abraded due to a repeated pressing of the actuator.

9. The mobile terminal of claim 8, wherein the visual information comprises a set of images, each image of the set of images being displayed via a respective one of the plurality of dome-shaped areas, and at least two images in the set are related to the first application.

10. The mobile terminal of claim 9, wherein the first display is configured to display a screen image corresponding to one of a plurality of images displayed on the second display.

11. The mobile terminal of claim 9, wherein the actuator is configured to receive user input and each of the plurality of dome-shaped areas is configured as a key for receiving a specific user input.

12. The mobile terminal of claim 9, wherein at least one of the plurality of dome-shaped areas is configured as a specific key for receiving an input for displaying a different set of images on the second display.

13. The mobile terminal of claim 12, wherein the different set of images comprises at least two identical images that were also included in a previous image set.

14. The mobile terminal of claim 8, wherein the second display is configured to display the same visual information as displayed on the first display.

15. The apparatus of claim 1, wherein the first set of key marks comprise a plurality of numbers to permit data entry, wherein the second set of key marks comprise a plurality of images, wherein each image of the plurality of images is associated with a phone book entry such that each key mark of the second set of key marks serve as a hotkey for an associated image.

16. The apparatus of claim 1, wherein the first light-transmissive electrode pattern and the second light-transmissive electrode pattern lie in a same plane.

* * * * *